US012771477B2

(12) United States Patent
Liang et al.

(10) Patent No.: US 12,771,477 B2
(45) Date of Patent: Oct. 20, 2026

(54) METHODS AND APPARATUS FOR DATA TRANSMISSION

(71) Applicant: ZTE Corporation, Shenzhen (CN)

(72) Inventors: Chulong Liang, Shenzhen (CN); Wei Zhao, Shenzhen (CN); Jin Xu, Shenzhen (CN); Liguang Li, Shenzhen (CN); Guanghui Yu, Shenzhen (CN); Jian Kang, Shenzhen (CN); Qiang Fu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 57 days.

(21) Appl. No.: 18/936,533

(22) Filed: Nov. 4, 2024

(65) Prior Publication Data

US 2025/0088310 A1 Mar. 13, 2025

Related U.S. Application Data

(63) Continuation of application No. PCT/CN2022/129018, filed on Nov. 1, 2022.

(51) Int. Cl.
*H04L 1/00* (2006.01)

(52) U.S. Cl.
CPC .......... *H04L 1/0057* (2013.01); *H04L 1/0067* (2013.01)

(58) Field of Classification Search
CPC ....... H04L 1/00; H04L 1/0057; H04L 1/0067; H04L 1/0041; H04L 1/0013; H03M 13/29; H03M 13/65; H03M 13/6583
See application file for complete search history.

(56) References Cited

U.S. PATENT DOCUMENTS

| | | | | |
|---|---|---|---|---|
| 10,374,754 B2 * | 8/2019 | Shen | ..................... | H03M 13/27 |
| 11,258,463 B2 * | 2/2022 | Luo | ..................... | H03M 13/616 |
| 11,258,535 B2 * | 2/2022 | Noh | ..................... | H04L 1/0057 |
| 12,184,413 B2 * | 12/2024 | Jang | ..................... | H03M 13/27 |

(Continued)

FOREIGN PATENT DOCUMENTS

| | | |
|---|---|---|
| CN | 106817195 A | 6/2017 |
| CN | 113810060 A | 12/2021 |
| EP | 1501226 A1 | 1/2005 |

OTHER PUBLICATIONS

Rowshan, M., Viterbo, E., Micheloni, R. and Marelli, A. (2019), Repetition-assisted decoding of polar codes. Electron. Lett., 55: 270-272. https://doi.org/10.1049/el.2018.6940 (Year: 2019).*

(Continued)

*Primary Examiner* — Albert Decady
*Assistant Examiner* — Grace V Braden
(74) *Attorney, Agent, or Firm* — Ashurst Perkins Coie US LLP

(57) ABSTRACT

Methods, apparatus, and systems that relate to rate matching scheme design for polar coding, PAC coding, or other pre-transformed polar coding are disclosed. In one example aspect, a method for digital communication includes determining, by a first node, an output bit sequence having E bits based on an input bit sequence c having K bits, wherein the output bit sequence is determined based on an output of a polar transform and an output of a repetition operation, and wherein the input of the repetition operation is a portion of a bit sequence before the polar transform. The method also includes transmitting, by the first node, a signal including the output bit sequence to a second node.

16 Claims, 14 Drawing Sheets

(56) References Cited

U.S. PATENT DOCUMENTS

| | | | |
|---|---|---|---|
| 2018/0331783 | A1 | 11/2018 | Ahn et al. |
| 2020/0235755 | A1 | 7/2020 | Luo et al. |
| 2023/0113448 | A1 | 4/2023 | Dai et al. |

OTHER PUBLICATIONS

Lieb, Julia, et al. "Convolutional Codes." Concise Encyclopedia of Coding Theory, 1st ed., Chapman & Hill, 2021 (Year: 2021).*

European Search Report issued in EP Patent Application No. 22963836.6, dated Jun. 3, 2025, 14 pages.

Tonnellier et al., "On Systematic Polarization-Adjusted Convolutional (PAC) Codes," IEEE Communications Letters, vol. 25, No. 7, Jul. 2021, 5 pages, pp. 2128-2132.

Song et al., "K-User Parallel Concatenated Code for Gaussian Multiple-Access Channel," IEEE ICC 2013—Communications Theory, 6 pages, pp. 3286-3291.

Wu et al., "Parallel concatenated systematic polar codes," Electronic Letters, Jan. 8, 2016, vol. 52, No. 1, pp. 43-45, 2 p.

Rowshan et al., "On Convolutional Precoding in PAC Codes," 2021 IEEE Globecom Workshops, 6 pages.

Korean office action issued in KR Patent Application No. 10-2024-7037025, dated Jan. 22, 2026, 8 pages. English translation included.

International Search Report and Written Opinion issued in International Patent Application No. PCT/CN2022/129018, dated Jun. 15, 2023, 6 pages.

Mediatek Inc., "Polar rate-matching design and performance," 3GPP TSG RAN WG1 RAN1 Meeting #90, R1-1713705, Prague, Czech, Aug. 21-25, 2017, 7 pages.

* cited by examiner

METHODS AND APPARATUS FOR DATA TRANSMISSION

CROSS-REFERENCE TO RELATED APPLICATIONS

This application is a continuation of International Patent Application No. PCT/CN2022/129018, filed on Nov. 1, 2022, the contents of which are incorporated herein by reference in their entirety.

TECHNICAL FIELD

This invention is related to the channel coding technique in communication systems.

BACKGROUND

Mobile telecommunication technologies are moving the world toward an increasingly connected and networked society. In comparison with the existing wireless networks, next generation systems and communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This patent document discloses techniques, among other things, rate matching design for polar coding, PAC coding and/or other pre-transformed polar coding schemes.

In one example aspect, a first digital communication method is disclosed. The method includes determining, by a first node, an output bit sequence having E bits based on an input bit sequence c having K bits, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform; and transmitting, by the first node, a signal including the output bit sequence to a second node.

In another example aspect, another method of wireless communication is disclosed. The method includes receiving, by a second node, a signal including an output bit sequence having E bits from a first node; and determining, by the second node, an input bit sequence c having K bits based on the signal, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform.

In yet another example aspect, a wireless communication device comprising a process that is configured or operable to perform the above-described methods is disclosed.

In yet another example aspect, a computer readable storage medium is disclosed. The computer-readable storage medium stores code that, upon execution by a processor, causes the processor to implement an above-described method.

DETAILED DESCRIPTION

Figure 1:
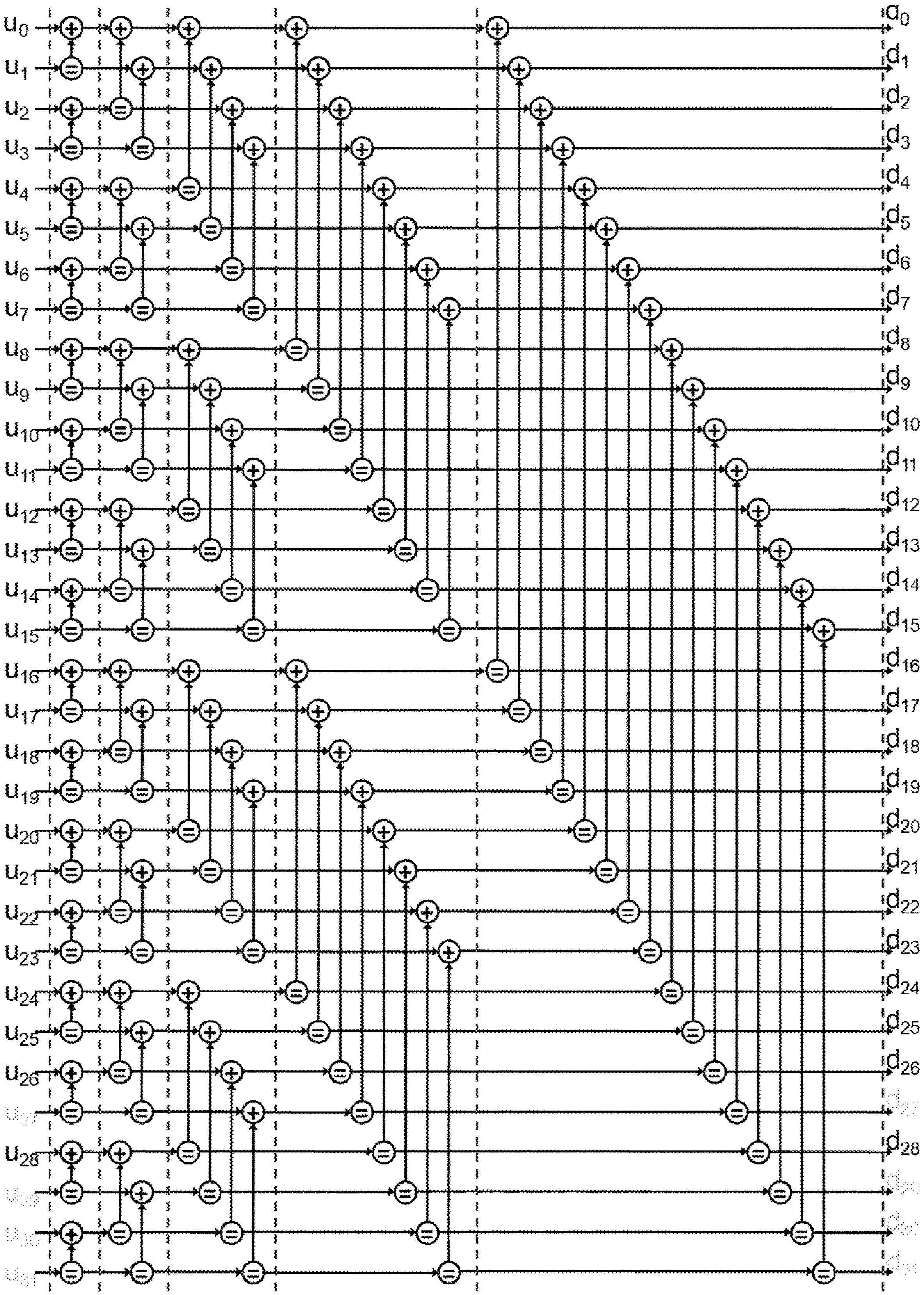
FIG. 1 shows an example of factor graph of the polar matrix $G^{(32)}$.

Headings for the various sections below are used to facilitate the understanding of the disclosed subject matter and do not limit the scope of the claimed subject matter in any way. Accordingly, one or more features of one section can be combined with one or more features of another section. Furthermore, 5G terminology is used for the sake of clarity of explanation, but the techniques disclosed in the present document are not limited to 5G technology only and may be used in wireless systems that implemented other protocols.

This application discloses methods and apparatuses related to rate matching schemes for pre-transformed polar coding in wireless communication systems.

In the fifth generation (5G) mobile communications standard of the 3rd Generation Partnership Project (3GPP), low-density parity-check (LDPC) codes are used for data transmission. However, LDPC codes is worse than polar codes in short payload size (also called transport block size (TBS)). Also, LDPC codes have high error floors (at block error rate (BLER) of 0.0001). To fulfill the future ultra-reliable low latency communication (URLLC), we have to design more powerful channel codes.

Polarization-adjusted convolutional (PAC) codes can achieve finite-length bounds in moderate decoding complexity. PAC codes are a revolution of polar codes. As a result, PAC codes have code lengths with power of 2($N=2^n$ with positive integer n) as polar codes. However, to efficiently transmitting a payload (or transport block (TB)) in different wireless channel environments, it does not always have a code length of $N=2^n$ in time and frequency resources allocated by a base station (BS). As a result, rate matching schemes are needed for applying PAC codes in wireless communications. In this application, methods and apparatus for design in rate matching for polar coding, PAC coding, or other pre-transformed polar coding are proposed with good performance.

Introduction

Notations

- GF(2) denotes the Galois field of size 2 with two elements "0" and "1".
- br(i) is the bit-reversal function.
- floor(x) denotes the largest integer not greater than x.
- ceil(x) denotes the smallest integer not less than x.
- round(x) is the round function such that round(x) is the integer closest to x, for example, round(3.2)=3, round (4.8)=5, round(2.5)=3, round(−1.9)=−2, round(−3.4)=−3.
- max(x,y) denotes the maximum value between x and y, i.e., $$\max(x, y) = \begin{cases} x, & x \geq y, \\ y, & y > x \end{cases}.$$

- mod(x, y) denotes the remainder of x divided by y. For example, mod(5, 3)=2 and mod(3, 5)=3.
- $X_{i,j}$ denotes the element in the i-th row and j-th column of a matrix X, where a boldface capital letter is used to represent a matrix.
- $[x_0, x_1, \ldots, x_{Y-1}]$ denotes a sequence (or a vector) of length Y containing elements $x_0, x_1, \ldots, x_{Y-1}$. A boldface small letter x is used to represent a sequence (or a vector) $[x_0, x_1, \ldots, x_{Y-1}]$.
- $\{x_0, x_1, \ldots, x_{Y-1}\}$ denotes a set with Y distinct elements $x_0, x_1, \ldots, x_{Y-1}$, i.e., for any i≠j, $x_i \neq x_j$.
- $<x_0, x_1, \ldots, x_{Y-1}>$ denotes an ordered set with Y distinct elements $x_0, x_1, \ldots, x_{Y-1}$, i.e., for any i≠j, $x_i \neq x_j$. Let $<x_0, x_1, \ldots, x_{Y-1}>$, X(i) denotes the i-th element $x_i$ in the ordered set X.

For a set X, |X| denotes the set size, i.e., the number of elements in the set X.

- $Z_N=\{0, 1, \ldots, N-2, N-1\}$ denotes the integer set containing all non-negative integers smaller than N.

Indices for sequences, vectors, or matrices are starting from zero.

Introduction to Polar Matrix

This section introduces some concepts of use of a polar matrix according to various embodiments.

We denote $G^{(N)}$ as a polar transform matrix (or simply, polar matrix) with N rows and N columns, where N is power of 2, i.e., $N=2^n$ and n is a positive integer. n is called the order of the polar matrix of $G^{(N)}$ and N is called the polar matrix size of $G^{(N)}$, i.e., $G^{(N)}$ is of size N.

$G^{(N)}$ can be one of the following:

$$G^{(N)}=(P^{(2)})^{\otimes n}; \quad 1)$$

$$G^{(N)}=B^{(N)}\cdot(P^{(2)})^{\otimes n}; \quad 2)$$

$$G^{(N)}=P^{(N)}; \quad 3)$$

$$G^{(N)}=B^{(N)}\cdot P^{(N)}; \quad 4)$$

Here, all the matrix operations are over GF(2), e.g., $$P^{(N)} = \begin{bmatrix} P^{(N/2)} & 0 \\ P^{(N/2)} & P^{(N/2)} \end{bmatrix}, P^{(2)} = \begin{bmatrix} 1 & 0 \\ 1 & 1 \end{bmatrix}, P^{(1)} = [1], (P^{(2)})^{\otimes n}$$

is the n-th Kronecker power of the matrix $P^{(2)}$, and $B^{(N)}$ is a bit-reversal permutation matrix with N rows and N columns, 0 is an all-zero matrix with N/2 rows and N/2 columns.

Let $$B_{i,j}^{(N)}$$

be the element at the i-th row and j-th column of the bit-reversal permutation matrix $B^{(N)}$. Then, $$B_{i,j}^{(N)} = \begin{cases} 1, & j = br(i), \\ 0, & j \neq br(i), \end{cases}$$

for 0≤i<N and 0≤j<N, where br(i) is the bit-reversal function defined as $$br(i) = \sum_{k=0}^{n-1} b_k \cdot 2^{n-1-k}$$

and $[b_{n-1}, b_{n-2}, \ldots, b_1, b_0]$ is the n-bit binary expansion of the integer i, i.e., $$i = \sum_{k=0}^{n-1} b_k \cdot 2^k.$$

A sequence (or a vector) x of length N over GF(2) multiplying the polar matrix $G^{(N)}$ over GF(2) is called polar transform on the sequence (vector) x. Denote $y=x\cdot G^{(N)}$, where the vector-matrix multiplication is over GF(2). Then, y is the polar transform of x.

FIG. 1 shows the factor graph of the polar matrix $G^{(32)}$ of size N=32 and the matrix $G^{(32)}$ is shown below as:

$$G^{(32)} = \begin{bmatrix}
1&0&0&0&0&0&0&0&0&0&0&0&0&0&0&0&0&0&0&0&0&0&0&0&0&0&0&0&0&0&0&0\\
1&1&0&0&0&0&0&0&0&0&0&0&0&0&0&0&0&0&0&0&0&0&0&0&0&0&0&0&0&0&0&0\\
1&0&1&0&0&0&0&0&0&0&0&0&0&0&0&0&0&0&0&0&0&0&0&0&0&0&0&0&0&0&0&0\\
1&1&1&1&0&0&0&0&0&0&0&0&0&0&0&0&0&0&0&0&0&0&0&0&0&0&0&0&0&0&0&0\\
1&0&0&0&1&0&0&0&0&0&0&0&0&0&0&0&0&0&0&0&0&0&0&0&0&0&0&0&0&0&0&0\\
1&1&0&0&1&1&0&0&0&0&0&0&0&0&0&0&0&0&0&0&0&0&0&0&0&0&0&0&0&0&0&0\\
1&0&1&0&1&0&1&0&0&0&0&0&0&0&0&0&0&0&0&0&0&0&0&0&0&0&0&0&0&0&0&0\\
1&1&1&1&1&1&1&1&0&0&0&0&0&0&0&0&0&0&0&0&0&0&0&0&0&0&0&0&0&0&0&0\\
1&0&0&0&0&0&0&0&1&0&0&0&0&0&0&0&0&0&0&0&0&0&0&0&0&0&0&0&0&0&0&0\\
1&1&0&0&0&0&0&0&1&1&0&0&0&0&0&0&0&0&0&0&0&0&0&0&0&0&0&0&0&0&0&0\\
1&0&1&0&0&0&0&0&1&0&1&0&0&0&0&0&0&0&0&0&0&0&0&0&0&0&0&0&0&0&0&0\\
1&1&1&1&0&0&0&0&1&1&1&1&0&0&0&0&0&0&0&0&0&0&0&0&0&0&0&0&0&0&0&0\\
1&0&0&0&1&0&0&0&1&0&0&0&1&0&0&0&0&0&0&0&0&0&0&0&0&0&0&0&0&0&0&0\\
1&1&0&0&1&1&0&0&1&1&0&0&1&1&0&0&0&0&0&0&0&0&0&0&0&0&0&0&0&0&0&0\\
1&0&1&0&1&0&1&0&1&0&1&0&1&0&1&0&0&0&0&0&0&0&0&0&0&0&0&0&0&0&0&0\\
1&1&1&1&1&1&1&1&1&1&1&1&1&1&1&1&0&0&0&0&0&0&0&0&0&0&0&0&0&0&0&0\\
1&0&0&0&0&0&0&0&0&0&0&0&0&0&0&0&1&0&0&0&0&0&0&0&0&0&0&0&0&0&0&0\\
1&1&0&0&0&0&0&0&0&0&0&0&0&0&0&0&1&1&0&0&0&0&0&0&0&0&0&0&0&0&0&0\\
1&0&1&0&0&0&0&0&0&0&0&0&0&0&0&0&1&0&1&0&0&0&0&0&0&0&0&0&0&0&0&0\\
1&1&1&1&0&0&0&0&0&0&0&0&0&0&0&0&1&1&1&1&0&0&0&0&0&0&0&0&0&0&0&0\\
1&0&0&0&1&0&0&0&0&0&0&0&0&0&0&0&1&0&0&0&1&0&0&0&0&0&0&0&0&0&0&0\\
1&1&0&0&1&1&0&0&0&0&0&0&0&0&0&0&1&1&0&0&1&1&0&0&0&0&0&0&0&0&0&0\\
1&0&1&0&1&0&1&0&0&0&0&0&0&0&0&0&1&0&1&0&1&0&1&0&0&0&0&0&0&0&0&0\\
1&1&1&1&1&1&1&1&0&0&0&0&0&0&0&0&1&1&1&1&1&1&1&1&0&0&0&0&0&0&0&0\\
1&0&0&0&0&0&0&0&1&0&0&0&0&0&0&0&1&0&0&0&0&0&0&0&1&0&0&0&0&0&0&0\\
1&1&0&0&0&0&0&0&1&1&0&0&0&0&0&0&1&1&0&0&0&0&0&0&1&1&0&0&0&0&0&0\\
1&0&1&0&0&0&0&0&1&0&1&0&0&0&0&0&1&0&1&0&0&0&0&0&1&0&1&0&0&0&0&0\\
1&1&1&1&0&0&0&0&1&1&1&1&0&0&0&0&1&1&1&1&0&0&0&0&1&1&1&1&0&0&0&0\\
1&0&0&0&1&0&0&0&1&0&0&0&1&0&0&0&1&0&0&0&1&0&0&0&1&0&0&0&1&0&0&0\\
1&1&0&0&1&1&0&0&1&1&0&0&1&1&0&0&1&1&0&0&1&1&0&0&1&1&0&0&1&1&0&0\\
1&0&1&0&1&0&1&0&1&0&1&0&1&0&1&0&1&0&1&0&1&0&1&0&1&0&1&0&1&0&1&0\\
1&1&1&1&1&1&1&1&1&1&1&1&1&1&1&1&1&1&1&1&1&1&1&1&1&1&1&1&1&1&1&1
\end{bmatrix}$$

Polar Matrix $G^{(32)}$

Introduction to 3GPP 5G Polar Coding

Some example embodiments of use of polar coding according to 3GPP 5G standard are disclosed in this section.

In the 3GPP 5G standard, polar codes are used in control channel transmission. The diagram of 5G polar coding with rate matching is shown in FIG. 2A.

Denote Q a data bit index set of size K, i.e., $|Q|=K$, where Q is a subset of an integer set $Z_N=\{0, 1, \ldots, N-2, N-1\}$ containing all non-negative integers smaller than N. Then, the encoding of an input bit sequence $c=[c_0, c_1, \ldots, c_{K-2}, c_{K-1}]$ into an output bit sequence $e=[e_0, e_1, \ldots, e_{E-2}, e_{E-1}]$ for the 5G polar coding with a polar matrix $G^{(N)}$ includes the following operations, where K is the length of the input bit sequence, E is the length of the output bit sequence, K and E are positive integers, K<N, and K<E.

Figure 2A:
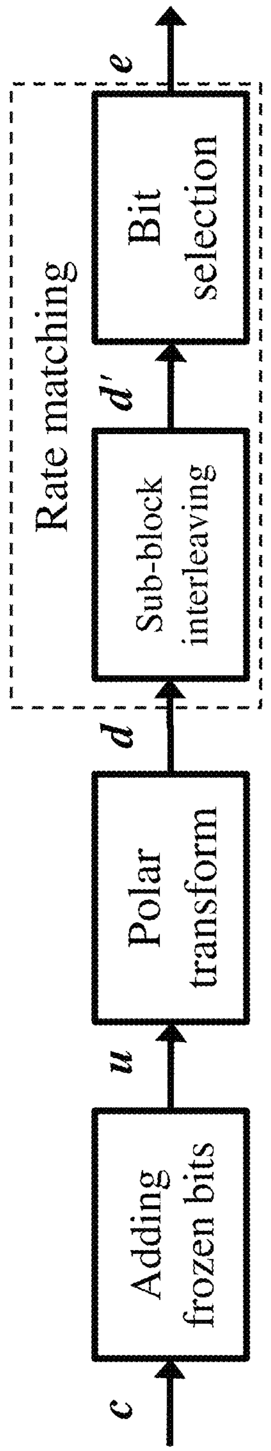
FIG. 2A shows a diagram of polar coding with rate matching in 3GPP 5G standard.

As shown in FIG. 2A, there are 3 main steps involved in the process: adding frozen bits, polar transform and rate matching. The rate matching step further includes sub-block interleaving and bit selection.

(1) Adding frozen bits: The adding-frozen-bits operation combines N−K zero bits with the input bit sequence c to form a polar transform input sequence $u=[u_0, u_1, \ldots, u_{N-2}, u_{N-1}]$ of length N according to the data bit index set Q.

The polar transform input sequence u is determined by the input bit sequence c, the data bit index set Q, and the polar matrix size N as follows:

```
k = 0;
For i = 0 to N-1
  If i ∈ Q
    u_i = c_k;
```

-continued

```
    k = k + 1;
  Else
    u_i = 0;
  End if
End for
```

(2) Polar transform: The polar transform is converting a first length-N bit sequence into a second length-N bit sequence by multiplying the first length-N bit sequence and the polar matrix $G^{(N)}$ over GF(2). A polar transform output bit sequence $d=[d_0, d_1, \ldots, d_{n-2}, d_{n-1}]$ of length N is determined by the polar transform input sequence u and the polar matrix $G^{(N)}$ as $d=u\cdot G^{(N)}$, where the vector-matrix multiplication is over GF(2).

(3) Rate matching: The rate matching of polar coding in 5G includes two operations: Sub-block interleaving and bit selection.

(3.1) Sub-block interleaving: An interleaving output bit sequence $d'=[d'_0, d'_1, \ldots, d'_{N-2}, d'_{N-1}]$ of length N is determined by a sub-block interleaver pattern π of length 32, the polar transform output bit sequence d, and the polar matrix size N as follows:

```
For i = 0 to N-1
  j = floor(32i/N);
  J_i = π_j×(N/32) + mod(i, N/32);
  d'_i = d_{J_i};
End for
```

where $\pi=[\pi_0, \pi_1, \pi_2, \pi_3, \pi_4, \pi_5, \pi_6, \pi_7, \pi_8, \pi_9, \pi_{10}, \pi_{11}, \pi_{12}, \pi_{13}, \pi_{14}, \pi_{15}, \pi_{16}, \pi_{17}, \pi_{18}, \pi_{19}, \pi_{20}, \pi_{21}, \pi_{22}, \pi_{23}, \pi_{24},$ $\pi_{25}, \pi_{26}, \pi_{27}, \pi_{28}, \pi_{29}, \pi_{30}, \pi_{31}$]=[0, 1, 2, 4, 3, 5, 6, 7, 8, 16, 9, 17, 10, 18, 11, 19, 12, 20, 13, 21, 14, 22, 15, 23, 24, 25, 26, 28, 27, 29, 30, 31], and $J=[J_0, J_1, \ldots, J_{N-2}, J_{N-1}]$ is an interleaver pattern of length N determined by the sub-block interleaver pattern π and the polar matrix size N. The interleaver pattern J is a permutation of the integer sequence [0, 1, 2, . . . , N−2, N−1].

(3.2) Bit selection: There are three types of bit selection named as repetition, puncturing and shortening. With the interleaving output bit sequence d', the length of the input bit sequence K, the length of the output bit sequence E, and the polar matrix size N, the output bit sequence e is determined as follows:

Repetition: For E≥N, $e_k=d'_{mod(k,N)}$, k=0, 1, 2, . . . , E−2, E−1.

Puncturing: For E<N and K/E≤7/16, $e_k=d'_{N-E+k}$, k=0, 1, 2, . . . , E−2, E−1.

Shortening: For E<N and K/E>7/16, $e_k=d'_k$, k=0, 1, 2, . . . , E−2, E−1.

Polarization-Adjusted Convolutional (PAC) Coding

Some example embodiments of PAC coding are disclosed in this section.

PAC codes is a class of pre-transformed polar codes. Specifically, PAC codes are polar codes using convolution transform.

Figure 2B:
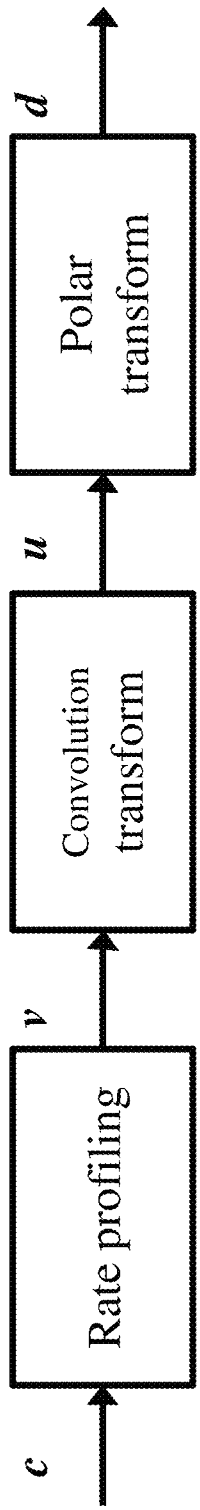
FIG. 2B shows a diagram of PAC coding.

The diagram of PAC coding is shown in FIG. 2B. Denote Q a data bit index set of size K, i.e., |Q|=K, where Q is a subset of an integer set $Z_N$={0, 1, . . . , N−2, N−1} containing all non-negative integers smaller than N. Then, the encoding of an input bit sequence $c=[c_0, c_1, \ldots, c_{K-2}, c_{K-1}]$ into an output bit sequence $e=[e_0, e_1, \ldots, e_{E-2}, e_{E-1}]$ by the polar matrix $G^{(N)}$ includes the following operations, where K is the length of the input bit sequence, E is the length of the output bit sequence, K<N, K<E and K and E are positive integers.

Figure 3:
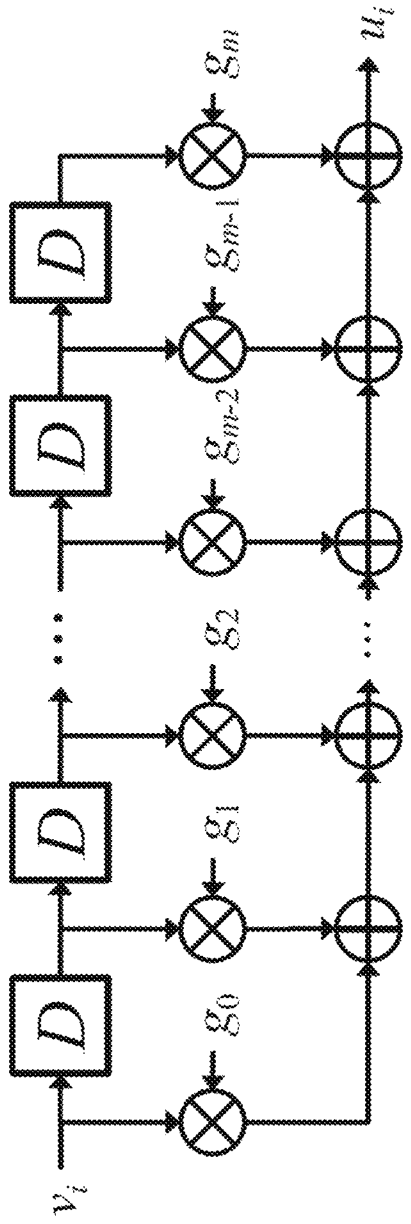
FIG. 3 shows a diagram for a convolution transform with either a convolution vector $g=[g_0, g_1, \ldots, g_m]$ or a convolution polynomial $g(D)=g_0+g_1 \cdot D+ \ldots +g_{m-1} \cdot D^{m-1}+g_m \cdot D^m$ over GF(2).

FIG. 3 discloses an example diagram for a convolution transform with either a convolution vector $g=[g_0, g_1, \ldots, g_m]$ or a convolution polynomial $g(D)=g_0+g_1\cdot D+\ldots+g_{m-1}\cdot D^{m-1}+g_m\cdot D^m$ over GF(2).

(1) Rate profiling: The rate profiling is an operation same as the adding-frozen-bits operation in the 5G polar coding. Thus, the two terms "adding-frozen-bits" and "rate profiling" are used interchangeably to refer to the same operation in this document. The rate-profiling operation combines N−K zero bits with the input bit sequence c to form a rate-profiling output sequence $v=[v_0, v_1, \ldots, v_{N-2}, v_{N-1}]$ of length N according to the data bit index set Q. Specifically, the rate-profiling output bit sequence v is determined by the input bit sequence c, the data bit index set Q, and the polar matrix size N as follows.

```
k = 0;
For i = 0 to N-1
  If i ∈ Q
    v_i = c_k;
    k = k + 1;
  Else
      v_i = 0;
    End if
End for
```

(2) Convolution transform: the convolution transform is an operation converting a convolution input bit sequence of length N into a convolution output bit sequence of length N by performing convolution on the convolution input bit sequence and a generator bit sequence $g=[g_0, g_1, \ldots, g_{m-1}, g_m]$ of length−(m+1) defining a generator polynomial $g(D)=g_0+g_1\cdot D+\ldots+g_{m-1}\cdot D^{m-1}+g_m\cdot D^m$ over GF(2), where m is the memory length of the convolution transform or equivalently the generator polynomial degree of the generator polynomial g(D) and D is a dummy variable representing delay in a digital circuit.

The convolution transform with the generator polynomial g(D) is shown in FIG. 3. Specifically, a convolution transform output bit sequence $u=[u_0, u_1, \ldots, u_{N-2}, u_{N-1}]$ of length N is determined by the rate-profiling output bit sequence v, the generator polynomial g(D) (or equivalently the generator bit sequence g) and the polar matrix size N as follows, where $v_{i-k}=0$ for i<k.

```
For i = 0 to N-1
  u_i = 0;
  For k = 0 to m
    u_i = mod(u_i + gk·v_{i-k}, 2);
  End for
End for
```

Polar transform: The polar transform is the same as in the 5G polar coding. A polar transform output bit sequence $d=[d_0, d_1, \ldots, d_{N-2}, d_{N-1}]$ of length N is determined according to the convolution transform output bit sequence u and the polar matrix $G^{(N)}$ as $d=u\cdot G^{(N)}$, where the vector-matrix multiplication is over GF(2).

INTRODUCTION TO EMBODIMENTS

This section discloses multiple examples related to rate matching for polar coding, PAC coding, or other pre-transformed polar coding with good performance.

FIG. 4 shows diagrams of eight example rate matching methods. The details of the examples will be explained in the following embodiments.

Embodiment 1

This section discloses an encoding method in a wireless communication system.

In one example, a method of digital communication comprising determining by a first node, an output bit sequence having E bits based on an input bit sequence c having K bits, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform.

The method further comprises transmitting, by the first node, a signal including the output bit sequence to a second node.

In another example, a method of digital communication, comprising: obtaining, by a first node, an input bit sequence $c=[c_0, c_1, \ldots, c_{K-1}]$; determining, by the first node, an output bit sequence $e=[e_0, e_1, \ldots, e_{E-1}]$ by performing at least one of the following: a rate profiling, a repetition, a pre-transform, a polar transform using a polar matrix $G^{(N)}$, an interleaving, a concatenation; and transmitting, by the first node, a signal including the output bit sequence e to a second node.

Here, K is the input bit sequence length; E is the output bit sequence length; N is a polar matrix size being a power of two; K and E are positive integers with K<N and N≤E.

Embodiment 2

This section discloses a decoding method used in a wireless communication system.

In one example, a method of digital communication, comprising receiving, by a second node, a signal including an output bit sequence having E bits from a first node. The method further comprises determining by a first node, an input bit sequence c having K bits based on the signal, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform.

In another example, a method of digital communication, comprising receiving, by a second node, a signal including an output bit sequence $e=[e_0, e_1, \ldots, e_{E-1}]$ sent by a first node; and determining, by the second node, one or more estimated bit sequences of an input bit sequence $c=[c_0, c_1, \ldots, c_{K-1}]$.

In one example, the output bit sequence e is determined by the first node by at least one of the following: a rate profiling, a repetition, a pre-transform, a polar transform using a polar matrix $G^{(N)}$, an interleaving, a concatenation; wherein, K is the input bit sequence length; E is the output bit sequence length; N is a polar matrix size being a power of two; K and E are positive integers with $K<N$ and $N \leq E$.

Embodiment 3

This section discloses examples involving the output bit sequence comprising two parts.

Embodiment 3 is based on the above embodiments.

The output bit sequence $e=[e_0, e_1, \ldots, e_{E-1}]$ comprises a first part bit sequence $d'=[d'_0, d'_1, d'_2, \ldots, d'_{N-1}]$ of length N and a second part bit sequence $c'=[c'_0, c'_1, c'_2, \ldots, c'_{N-E-1}]$ of length N−E.

In some embodiments, the output bit sequence $e=[e_0, e_1, \ldots, e_{E-1}]$ is a concatenation of the first part bit sequence $d'=[d'_0, d'_1, d'_2, \ldots, d'_{N-1}]$ and the second part bit sequence $c'=[c'_0, c'_1, c'_2, \ldots, c'_{N-E-1}]$ as follows:

$$e_i = \begin{cases} d'_i, & i = 0, 1, \ldots, N-1, \\ c'_{i-N}, & i = N, N+1, N+2, \ldots, E-1. \end{cases}$$

In some embodiments, the output bit sequence $e=[e_0, e_1, \ldots, e_{E-1}]$ is a concatenation of the first part bit sequence $d'=[d'_0, d'_1, d'_2, \ldots, d'_{N-1}]$ and the second part bit sequence $c'=[c'_0, c'_1, c'_2, \ldots, c'_{N-E-1}]$ as follows:

$$e_i = \begin{cases} c'_i, & i = 0, 1, \ldots, E\text{-}N-1, \\ d'_{i-N}, & i = E\text{-}N, E\text{-}N+1, E\text{-}N+2, \ldots, E-1. \end{cases}$$

FIGS. 4A to 4H give eight specific examples for the output bit sequence e being a concatenation of the first part bit sequence d' and the second part bit sequence c'.

Embodiment 4

This section discloses examples involving the first part bit sequence is the output of an interleaving.

Embodiment 4 is based on the above embodiments.

In some embodiments, the first part bit sequence $d'=[d'_0, d'_1, d'_2, \ldots, d'_{N-1}]$ is an output bit sequence of an interleaving, wherein, specific examples are given in FIGS. 4B, 4D, 4F, and 4H; the interleaving comprises obtaining, by the first node, an interleaving input bit sequence $d=[d_0, d_1, \ldots, d_{N-1}]$ of length N; and determining, by the first node, the first part bit sequence $d'=[d'_0, d'_1, \ldots, d'_{N-1}]$ of length N; wherein, N is the polar matrix size.

The interleaving determines the first part bit sequence $d'=[d'_0, d'_1, \ldots, d'_{N-1}]$ corresponding to the interleaving input bit sequence d by an interleaver pattern $J=[J_0, J_1, \ldots, J_{N-2}, J_{N-1}]$ of length N as $d'_i=d_{J_i}$, i=0, 1, 2, . . . , N−2, N−1, i.e., the i-th bit of the first part bit sequence d' is equal to the $J_i$-th bit of the interleaving input bit sequence $d=[d_0, d_1, \ldots, d_{N-1}]$, wherein, the interleaver pattern J can be any permutation of the integer sequence [0, 1, 2, . . . , N−2, N−1].

A first specific example of the interleaver pattern $J=[J_0, J_1, \ldots, J_{N-2}, J_{N-1}]$ is determined as by the polar matrix size N and a sub-block interleaver pattern $\pi=[\pi_0, \pi_1, \pi_2, \pi_3, \pi_4, \pi_5, \pi_6, \pi_7, \pi_8, \pi_9, \pi_{10}, \pi_{11}, \pi_{12}, \pi_{13}, \pi_{14}, \pi_{15}, \pi_{16}, \pi_{17}, \pi_{18}, \pi_{19}, \pi_{20}, \pi_{21}, \pi_{22}, \pi_{23}, \pi_{24}, \pi_{25}, \pi_{26}, \pi_{27}, \pi_{28}, \pi_{29}, \pi_{30}, \pi_{31}]$=[0, 1, 2, 4, 3, 5, 6, 7, 8, 16, 9, 17, 10, 18, 11, 19, 12, 20, 13, 21, 14, 22, 15, 23, 24, 25, 26, 28, 27, 29, 30, 31] as follows.

```
For i = 0 to N-1
  j = floor(32i/N);
  J_i = π_j×(N/32) + mod(i, N/32);
End for
```

A second specific example of the interleaver pattern $J=[J_0, J_1, \ldots, J_{N-2}, J_{N-1}]$ is that the relationship between the index i and the i-th element $J_i$ in the interleaver pattern J satisfies the following quadratic form:

$$J_i = \mathrm{mod}(f_1 \cdot i + f_2 \cdot i^2, N),$$

where some examples of parameters $f_1$ and $f_2$ depending on the polar matrix size N are summarized in TABLE 1.

TABLE 1

| Interleaver parameters | | |
|---|---|---|
| N | $f_1$ | $f_2$ |
| 64 | 7 | 16 |
| 128 | 15 | 32 |
| 256 | 15 | 32 |
| 512 | 31 | 64 |
| 1024 | 31 | 64 |
| 2048 | 31 | 64 |
| 4096 | 31 | 64 |

A third specific example of the interleaver pattern $J=[J_0, J_1, \ldots, J_{N-2}, J_{N-1}]$ with N=8 is $J=[J_0, J_1, J_2, J_3, J_4, J_5, J_6, J_7]$=[5, 4, 7, 1, 6, 0, 2, 3].

Embodiment 5

This section discloses examples involving the interleaving input bit sequence is a polar transform output bit sequence.

Embodiment 5 is based on the above embodiments.

In some embodiments, the interleaving input bit sequence $d=[d_0, d_1, \ldots, d_{N-1}]$ is a polar transform output bit sequence of length N determined by a polar transform using a polar matrix $G^{(N)}$, wherein, specific examples are given in FIGS. 4B, 4D, 4F, and 4H.

Embodiment 6

This section discloses examples involving the first part bit sequence is a polar transform output bit sequence.

Embodiment 6 is based on the above embodiments.

In some embodiments, the first part bit sequence $d'=[d'_0, d'_1, d'_2, \ldots, d'_{N-1}]$ is equal to a polar transform output bit sequence $d=[d_0, d_1, d_2, \ldots, d_{N-1}]$ of length N determined by a polar transform using a polar matrix $G^{(N)}$, wherein, for $i=0, 1, 2, \ldots, N-1$, $d'_i=d_i$ with specific examples given in FIGS. 4A, 4C, 4E, and 4G.

Embodiment 7

This section discloses examples involving a polar transform.

Embodiment 7 is based on the above embodiments.

The polar transform determining the polar transform output bit sequence $d=[d_0, d_1, d_2, \ldots, d_{N-1}]$ comprises obtaining, by the first node, a polar transform input bit sequence $u=[u_0, u_1, \ldots, u_{N-1}]$; and determining, by the first node, a polar transform output bit sequence $d=[d_0, d_1, \ldots, d_{N-1}]$.

Here, the polar transform input bit sequence $u=[u_0, u_1, \ldots, u_{N-1}]$ is of length equal to the polar matrix size N. The polar transform output bit sequence d is determined by the first node by multiplying the polar transform input bit sequence u and the polar matrix $G^{(N)}$ of N rows and N columns, i.e., $d=u\cdot G^{(N)}$, wherein the vector-matrix multiplication is performed over GF(2).

Embodiment 8

This section discloses examples involving the polar transform input bit sequence is a pre-transform output bit sequence.

Embodiment 8 is based on the above embodiments.

In some embodiments, the polar transform input bit sequence $u=[u_0, u_1, \ldots, u_{N-1}]$ is a pre-transform output bit sequence of a pre-transform, wherein specific examples given in FIGS. 4C, 4D, 4G, and 4H.

The pre-transform comprises obtaining, by the first node, a pre-transform input bit sequence $v=[v_0, v_1, \ldots, v_{N-1}]$ of length N; and determining, by the first node, a pre-transform output bit sequence $u=[u_0, u_1, \ldots, u_{N-1}]$ of length N; wherein N is the polar matrix size.

Parameters for Determining the Pre-Transform

The pre-transform determines the pre-transform output bit sequence u corresponding to the pre-transform input bit sequence v by the first node using at least one of the following:

- a generator bit sequence $g=[g_0, g_1, \ldots, g_m]$ over GF(2),
- a generator polynomial $g(D)=g_0+g_1\cdot D+\ldots+g_{m-1}\cdot D^{m-1}+g_m\cdot D^m$ over GF(2),
- a recursive feedback bit sequence $q=[q_0, q_1, \ldots, q_m]$ over GF(2),
- a recursive feedback polynomial $q(D)=q_0+q_1\cdot D+\ldots+q_m\cdot D^m$ over GF(2),
- a state bit sequence $t=[t_0, t_1, \ldots, t_{m-1}, t_m]$ of length m+1, Here, m is called a memory length.

Pre-Transform Using a Generator Polynomial g(D) or a Generator Bit Sequence g

In some embodiments, the pre-transform determines the pre-transform output bit sequence u corresponding to the pre-transform input bit sequence v according to a generator polynomial $g(D)=g_0+g_1\cdot D+g_2\cdot D+\ldots+g_{m-1}\cdot D+g_m\cdot D$ (or equivalently a generator bit sequence $g=[g_0, g_1, g_2, \ldots, g_{m-1}, g_m]$), wherein m is called a memory length of the generator polynomial g(D) (or the generator bit sequence g).

The generator polynomial $g(D)=g_0+g_1\cdot D+\ldots+g_{m-1}\cdot D^{m-1}+g_m\cdot D^m$ can be any binary polynomial over GF(2), wherein m is the polynomial degree or the memory length.

In a specific example with a memory length m=6, a generator polynomial is $g(D)=g_0+g_1\cdot D+g_2\cdot D^2+g_3\cdot D^3+g_4\cdot D^4+g_5\cdot D^5+g_6\cdot D^6=1+0\cdot D+1\cdot D^2+1\cdot D^3+0\cdot D^4+1\cdot D^5+1\cdot D^6=1+D^2+D^3+D^5+D^6$.

In another specific example with a memory length m=3, a generator polynomial is $g(D)=g_0+g_1\cdot D+g_2\cdot D^2+g_3\cdot D^3=1+1\cdot D+0\cdot D^2+1\cdot D^3=1+D+D^3$. The generator bit sequence $g=[g_0, g_1, \ldots, g_m]$ can be any binary sequence of length m+1, wherein m is called the memory length. In a specific example with a memory length m=6, a generator bit sequence is $g=[g_0, g_1, g_2, g_3, g_4, g_5, g_6]=[1, 0, 1, 1, 0, 1, 1]$. In another specific example with a memory length m=3, a generator bit sequence is $g=[g_0, g_1, g_2, g_3]=[1, 1, 0, 1]$.

More specific examples for a generator polynomial $g(D)=g_0+g_1\cdot D+\ldots+g_m\cdot D^m$ are as follows:

$$\text{For } m=1,\ g(D)=g_0+g_1\cdot D+\ldots+g_m\cdot D^m=g_0+g_1\cdot D=1+D; \quad (1)$$

$$\text{For } m=2,\ g(D)=g_0+g_1\cdot D+\ldots+g_m\cdot D^m=g_0+g_1\cdot D+g_2\cdot D^2=1+D^2; \quad (2)$$

$$\text{For } m=3,\ g(D)=g_0+g_1\cdot D+\ldots+g_m\cdot D^m=g_0+g_1\cdot D+g_2\cdot D^2+g_3\cdot D^3=1+D+D^2+D^3; \quad (3)$$

$$\text{For } m=4,\ g(D)=g_0+g_1\cdot D+\ldots+g_m\cdot D^m=g_0+g_1\cdot D+g_2\cdot D^2+g_3\cdot D^3+g_4\cdot D^4=1+D+D^2+D^4 \text{ and } g(D)=g_0+g_1\cdot D+\ldots+g_m\cdot D^m=g_0+g_1\cdot D+g_2\cdot D^2+g_3\cdot D^3+g_4\cdot D^4=1+D^2+D^3+D^4; \quad (4)$$

$$\text{For } m=5,\ g(D)=g_0+g_1\cdot D+\ldots+g_m\cdot D^m=g_0+g_1\cdot D+g_2\cdot D^2+\ldots+g_3\cdot D^3+g_4\cdot D^4=1+D+D^2+D^4 \text{ and } g(D)=g_0+g_1\cdot D+\ldots+g_5\cdot D^5=1+D+D^3+D^5 \text{ and } d(D)=g_0+g_1\cdot D+\ldots+g_m\cdot D^m=g_0+g_1\cdot D+g_2\cdot D^2+\ldots+g_5\cdot D^5=1+D^2+D^4+D^5; \quad (4)(5)$$

$$\text{For } m=6,\ g(D)=g_0+g_1\cdot D+\ldots+g_m\cdot D^m=g_0+g_1\cdot D+g_2\cdot D^2+\ldots+g_6\cdot D^6=1+D^6; \quad (6)$$

$$\text{For } m=7,\ g(D)=g_0+g_1\cdot D+\ldots+g_m\cdot D^m=g_0+g_1\cdot D+g_2\cdot D^2+\ldots+g_7\cdot D^7=1+D^3+D^5+D^7 \text{ and } g(D)=g_0+g_1\cdot D+\ldots+g_m\cdot D^m=g_0+g_1\cdot D+g_2\cdot D^2+\ldots+g_7\cdot D^7=1+D^2+D^4+D^7; \quad (7)$$

$$\text{For } m=8,\ g(D)=g_0+g_1\cdot D+\ldots+g_m\cdot D^m=g_0+g_1\cdot D+g_2\cdot D^2+\ldots+g_8\cdot D^8=1+D^4+D^8; \quad (8)$$

$$\text{For } m=9,\ g(D)=g_0+g_1\cdot D+\ldots+g_m\cdot D^m=g_0+g_1\cdot D+g_2\cdot D^2+\ldots+g_9\cdot D^9=1+D^3+D^4+D^5+D^7+D^9 \text{ and } g(D)=g_0+g_1\cdot D+\ldots+g_m\cdot D^m=g_0+g_1\cdot D+g_2\cdot D^2+\ldots+g_9\cdot D^9=1+D^2+D^4+D^5+D^6+D^9; \quad (9)$$

-continued

For $m = 10$, $g(D) =$ (10)

$$g_0 + g_1 \cdot D + \ldots + g_m \cdot D^m = g_0 + g_1 \cdot D + g_2 \cdot D^2 + \ldots + g_{10} \cdot D^{10} = 1 + D^2 + D^6 + D^7 + D^{10} \text{ and } g(D) = g_0 + g_1 \cdot D + \ldots + g_m \cdot D^m = g_0 + g_1 \cdot D + g_2 \cdot D^2 + \ldots + g_{10} \cdot D^{10} = 1 + D^3 + D^4 + D^8 + D^{10};$$

For $m = 11$, (11)

$$g(D) = g_0 + g_1 \cdot D + \ldots + g_m \cdot D^m = g_0 + g_1 \cdot D + g_2 \cdot D^2 + \ldots + g_{11} \cdot D^{11} = 1 + D + D^2 + D^4 + D^8 + D^{10} + D^{11} \text{ and } g(D) = g_0 + g_1 \cdot D + \ldots + g_m \cdot D^m = g_0 + g_1 \cdot D + g_2 \cdot D^2 + \ldots + g_{11} \cdot D^{11} = 1 + D + D^3 + D^7 + D^9 + D^{10} + D^{11};$$

For $m = 12$, $g(D) =$ (12)

$$g_0 + g_1 \cdot D + \ldots + g_m \cdot D^m = g_0 + g_1 \cdot D + g_2 \cdot D^2 + \ldots + g_{12} \cdot D^{12} = 1 + D^2 + D^5 + D^6 + D^7 + D^8 + D^9 + D^{10} + D^{11} + D^{12} \text{ and } g(D) = g_0 + g_1 \cdot D + \ldots + g_m \cdot D^m = g_0 + g_1 \cdot D + g_2 \cdot D^2 + \ldots + g_{12} \cdot D^{12} = 1 + D + D^2 + D^3 + D^4 + D^5 + D^6 + D^7 + D^{10} + D^{12};$$

For $m = 13$, (13)

$$g(D) = g_0 + g_1 \cdot D + \ldots + g_m \cdot D^m = g_0 + g_1 \cdot D + g_2 \cdot D^2 + \ldots + g_{13} \cdot D^{13} = 1 + D + D^4 + D^5 + D^9 + D^{10} + D^{13} \text{ and } g(D) = g_0 + g_1 \cdot D + \ldots + g_m \cdot D^m = g_0 + g_1 \cdot D + g_2 \cdot D^2 + \ldots + g_{13} \cdot D^{13} = 1 + D^3 + D^4 + D^8 + D^9 + D^{12} + D^{13};$$

For $m = 14$, $g(D) =$ (14)

$$g_0 + g_1 \cdot D + \ldots + g_m \cdot D^m = g_0 + g_1 \cdot D + g_2 \cdot D^2 + \ldots + g_{14} \cdot D^{14} = 1 + D + D^2 + D^7 + D^8 + D^{10} + D^{12} + D^{14} \text{ and } g(D) = g_0 + g_1 \cdot D + \ldots + g_m \cdot D^m = g_0 + g_1 \cdot D + g_2 \cdot D^2 + \ldots + g_{14} \cdot D^{14} = 1 + D^2 + D^4 + D^6 + D^7 + D^{12} + D^{13} + D^{14};$$

For $m = 15$, $g(D) =$ (15)

$$g_0 + g_1 \cdot D + \ldots + g_m \cdot D^m = g_0 + g_1 \cdot D + g_2 \cdot D^2 + \ldots + g_{15} \cdot D^{15} = 1 + D + D^4 + D^6 + D^7 + D^8 + D^9 + D^{15} \text{ and } g(D) = g_0 + g_1 \cdot D + \ldots + g_m \cdot D^m = g_0 + g_1 \cdot D + g_2 \cdot D^2 + \ldots + g_{15} \cdot D^{15} = 1 + D^6 + D^7 + D^8 + D^9 + D^{11} + D^{14} + D^{15};$$

For $m = 16$, $g(D) =$ (16)

$$g_0 + g_1 \cdot D + \ldots + g_m \cdot D^m = g_0 + g_1 \cdot D + g_2 \cdot D^2 + \ldots + g_{16} \cdot D^{16} = 1 + D^2 + D^4 + D^6 + D^8 + D^{13} + D^{14} + D^{16} \text{ and } g(D) = g_0 + g_1 \cdot D + \ldots + g_m \cdot D^m = g_0 + g_1 \cdot D + g_2 \cdot D^2 + \ldots + g_{16} \cdot D^{16} = 1 + D^2 + D^3 + D^8 + D^{10} + D^{12} + D^{14} + D^{16};$$

wherein m is the memory length.

FIG. 3 shows a specific example diagram of a pre-transform using a generator polynomial $g(D)=g_0+g_1 \cdot D+ \ldots +g_{m-1} \cdot D^{m-1}+g_m \cdot D^m$ (or a generator bit sequence $g=[g_0, g_1, \ldots, g_m]$) of a memory length m, wherein a bit $u_i$ with an index i in a pre-transform output bit sequence u is determined by m+1 bit $v_i$, $v_{i-1}$, $v_{i-2}$, . . . , $v_{i-m}$ with consecutive indices i, i−1, i−2, . . . , i−m in a pre-transform input bit sequence v and the generator polynomial $g(D)=g_0+g_1 \cdot D+ \ldots +g_{m-1} \cdot D^{m-1}+g_m \cdot D^m$ (or the generator bit sequence $g=[g_0, g_1, \ldots, g_m]$) as $$u_i = \sum_{k=0}^{m} g_k \cdot v_{i-k},$$

Here, the summation and the multiplication are over GF(2); the bit $v_{i-k}=0$ for i<k; $g_k$ is a coefficient of the term with degree k in the generator polynomial $g(D)=g_0+g_1 \cdot D+ \ldots +g_{m-1} \cdot D^{m-1}+g_m \cdot D^m$ (or equivalently a bit with an index k in a generator bit sequence $g=[g_0, g_1, \ldots, g_m]$) over GF(2). A specific pseudo code is as follows.

```
For i = 0 to N-1
  k = 0;
  u_i = 0;
  While k ≤ m && k ≤ i
    u_i = mod(u_i + g_k·v_{i-k}, 2);
    k = k + 1;
  End while
End for
```

Pre-Transform Using a Recursive Feedback Polynomial q(D) or a Recursive Feedback Bit Sequence q In some embodiments, the pre-transform determines the pre-transform output bit sequence u corresponding to the pre-transform input bit sequence v according to a recursive feedback polynomial $q(D)=q_0+q_1 \cdot D+q_2 \cdot D+ \ldots +q_{m-1} \cdot D+q_m \cdot D$ (or equivalently a recursive feedback bit sequence $q=[q_0, q_1, q_2, \ldots, q_{m-1}, q_m]$), wherein m is called a memory length of the recursive feedback polynomial q(D) or (the recursive feedback bit sequence q).

The recursive feedback polynomial $q(D)=q_0+q_1 \cdot D+ \ldots +q_{m-1} \cdot D^{m-1}+q_m \cdot D^m$ is a binary polynomial with the zero-degree coefficient $q_0$ being 1 and other coefficients $q_1, \ldots, q_m$ being any binary values over GF(2), wherein m is a memory length. In a specific example with a memory length m=6, a recursive feedback polynomial is $q(D)=q_0+q_1 \cdot D+q_2 \cdot D^2+q_3 \cdot D^3+q_4 \cdot D^4+q_5 \cdot D^5+q_6 \cdot D^6=1+0 \cdot D+1 \cdot D^2+0 \cdot D^3+1 \cdot D^4+1 \cdot D^5+1 \cdot D^6=1+D^2+D^4+D^5+D^6$. In another specific example with a memory length m=3, a recursive feedback polynomial is $q(D)=q_0+q_1 \cdot D+q_2 \cdot D^2+q_3 \cdot D^3=1+0 \cdot D+1 \cdot D^2+1 \cdot D^3=1+D^2+D^3$. The recursive feedback bit sequence $q=[q_0, q_1, \ldots, q_m]$ is a binary sequence of length m+1 with $[q_1, \ldots, q_m]$ being any binary sequence of length m and $q_0=1$, wherein m is the memory length. In a specific example with a memory length m=3, a recursive feedback bit sequence is $q=[q_0, q_1, q_2, q_3, q_4, q_5, q_6]=[1, 0, 1, 0, 1, 1, 1]$. In another specific example with a memory length m=3, a recursive feedback bit sequence is $q=[q_0, q_1, q_2, q_3]=[1, 0, 1, 1]$.

Figure 5:
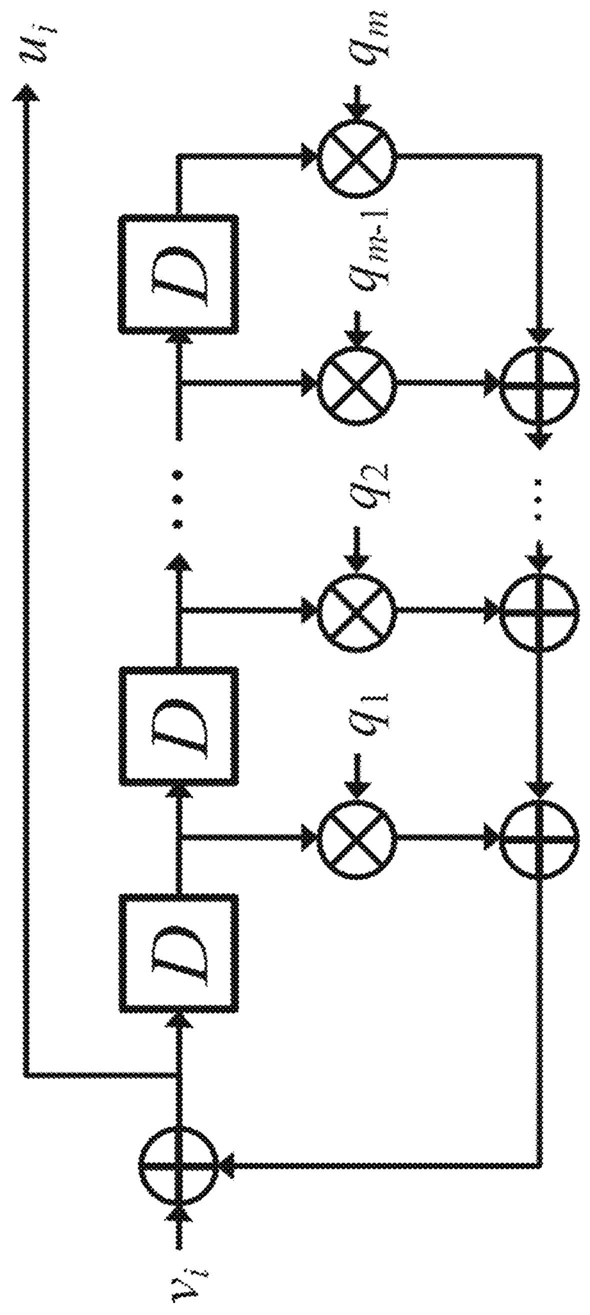
FIG. 5 shows a diagram for a pre-transform defined by a recursive feedback polynomial $q(D)=q_0+q_1 \cdot D+ \ldots + q_{m-1} \cdot D^{m-1}+q_m \cdot D^m$ (or equivalently a recursive feedback sequence $q=[q_0, q_1, \ldots, q_m]$) over GF(2) with $q_0=1$.

FIG. 5 shows a specific diagram of a pre-transform using a recursive feedback polynomial $q(D)=q_0+q_1 \cdot D+ \ldots +q_{m-1} \cdot D^{m-1}+q_m \cdot D^m$ (or equivalently a recursive feedback bit sequence $q=[q_0, q_1, q_2, \ldots, q_{m-1}, q_m]$) with $q_0=1$, and a memory length m, wherein a bit $u_i$ with an index i in a pre-transform output bit sequence u is determined by the following:

- a bit $v_i$ with an index i in a pre-transform input bit sequence $v=[v_0, v_1, \ldots, v_{N-1}]$,
- m previous bits $u_{i-1}$, $u_{i-2}$, . . . , $u_{i-m}$ with consecutive indices i−1, i−2, . . . , i−m in a pre-transform output bit sequence u, and
- a recursive feedback polynomial $q(D)=q_0+q_1 \cdot D+ \ldots +q_{m-1} \cdot D^{m-1}+q_m \cdot D^m$ (or a recursive feedback bit sequence $q=[q_0, q_1, \ldots, q_m]$) with $q_0=1$.

Here, a specific example is $$u_i = v_i + \sum_{k=0}^{m} g_k \cdot u_{i-k}$$

with the summation and the multiplication being over GF(2); the bit $u_{i-k}=0$ for i<k; $q_k$ is a coefficient of the term with degree k in the recursive feedback polynomial $q(D)=q_0+q_1\cdot D+ \ldots +q_{m-1}\cdot D^{m-1}+q_m\cdot D^m$ (or equivalently a bit with an index k in a recursive feedback bit sequence $q=[q_0, q_1, \ldots, q_m]$) over GF(2). A specific pseudo code is as follows.

```
For i = 0 to N-1
   k = 1;
   u_i = v_i;
   While k ≤ m && k ≤ i
      ui = mod(u_i + q_k·u_{i-k}, 2);
      k = k + 1;
   End while
End for
```

Pre-Transform Using Both a Generator Polynomial g(D) and a Recursive Feedback Polynomial q(D) (or Both a Generator Bit Sequence g and a Recursive Feedback Bit Sequence q)

In some embodiments, the pre-transform determines the pre-transform output bit sequence u corresponding to the pre-transform input bit sequence v according to both a generator polynomial $g(D)=g_0+g_1\cdot D+g_2\cdot D+ \ldots +g_{m-1}\cdot D+ g_m\cdot D$ and a recursive feedback polynomial $q(D)=q_0+q_1\cdot D+ \ldots +q_{m-1}\cdot D^{m-1}+q_m\cdot D^m$ (or equivalently both a generator bit sequence $g=[g_0, g_1, g_2, \ldots, g_{m-1}, g_m]$ and a recursive feedback bit sequence $q=[q_0, q_1, q_2, \ldots, q_{m-1}, q_m]$), wherein m is called a memory length for both the generator polynomial g(D) and the recursive feedback polynomial q(D) (or equivalently both the generator bit sequence g and the recursive feedback bit sequence q).

The generator polynomial $g(D)=g_0+g_1\cdot D+ \ldots +g_{m-1}\cdot D^{m-1}+g_m\cdot D^m$ can be any binary polynomial over GF(2), wherein m is the polynomial degree or the memory length. In a specific example with a memory length m=6, a generator polynomial is $g(D)=g_0+g_1\cdot D+g_2\cdot D^2+g_3\cdot D^3+g_4\cdot D^4+ g_5\cdot D^5+g_6\cdot D^6=1+0\cdot D+1\cdot D^2+1\cdot D^3+0\cdot D^4+1\cdot D^5+1\cdot D^6=1+D^2+ D^3+D^5+D^6$. In another specific example with a memory length m=3, a generator polynomial is $g(D)=g_0+g_1\cdot D+ g_2\cdot D^2+g_3\cdot D^3=1+1\cdot D+0\cdot D^2+1\cdot D^3=1+D+D^3$.

The generator bit sequence $g=[g_0, g_1, \ldots, g_m]$ can be any binary sequence of length m+1, wherein m is called the memory length. In a specific example with a memory length m=6, a generator bit sequence is $g=[g_0, g_1, g_2, g_3, g_4, g_5, g_6]$=[1, 0, 1, 1, 0, 1, 1]. In another specific example with a memory length m=3, a generator bit sequence is $g=[g_0, g_1, g_2, g_3]$=[1, 1, 0, 1].

The recursive feedback polynomial $q(D)=q_0+q_1\cdot D+ \ldots +q_{m-1}\cdot D^{m-1}+q_m\cdot D^m$ is a binary polynomial with the zero-degree coefficient $q_0$ being 1 and other coefficients $q_1, \ldots, q_m$ being any binary values over GF(2), wherein m is the memory length. In a specific example with a memory length m=6, a recursive feedback polynomial is $q(D)=q_0+ q_1\cdot D+q_2\cdot D^2+q_3\cdot D^3+q_4\cdot D^4+q_5\cdot D^5+q_6\cdot D^6=1+0\cdot D+1\cdot D^2+ 0\cdot D^3+1\cdot D^4+1\cdot D^5+1\cdot D^6=1+D^2+D^4+D^5+D^6$.

In another specific example with a memory length m=3, a recursive feedback polynomial is $q(D)=q_0+q_1\cdot D+q_2\cdot D^2+ q_3\cdot D^3=1+0\cdot D+1\cdot D^2+1\cdot D^3=1+D^2+D^3$. The feedback bit sequence $q=[q_0, q_1, \ldots, q_m]$ is a binary sequence of length m+1 with $[q_1, \ldots, q_m]$ being any binary sequence of length m and $q_0=1$, wherein m is the memory length.

In a specific example with a memory length m=3, a feedback bit sequence is $q=[q_0, q_1, q_2, q_3, q_4, q_5, q_6]$=[1, 0, 1, 0, 1, 1, 1]. In another specific example with a memory length m=3, a feedback bit sequence is $q=[q_0, q_1, q_2, q_3]$=[1, 0, 1, 1].

Figure 6:
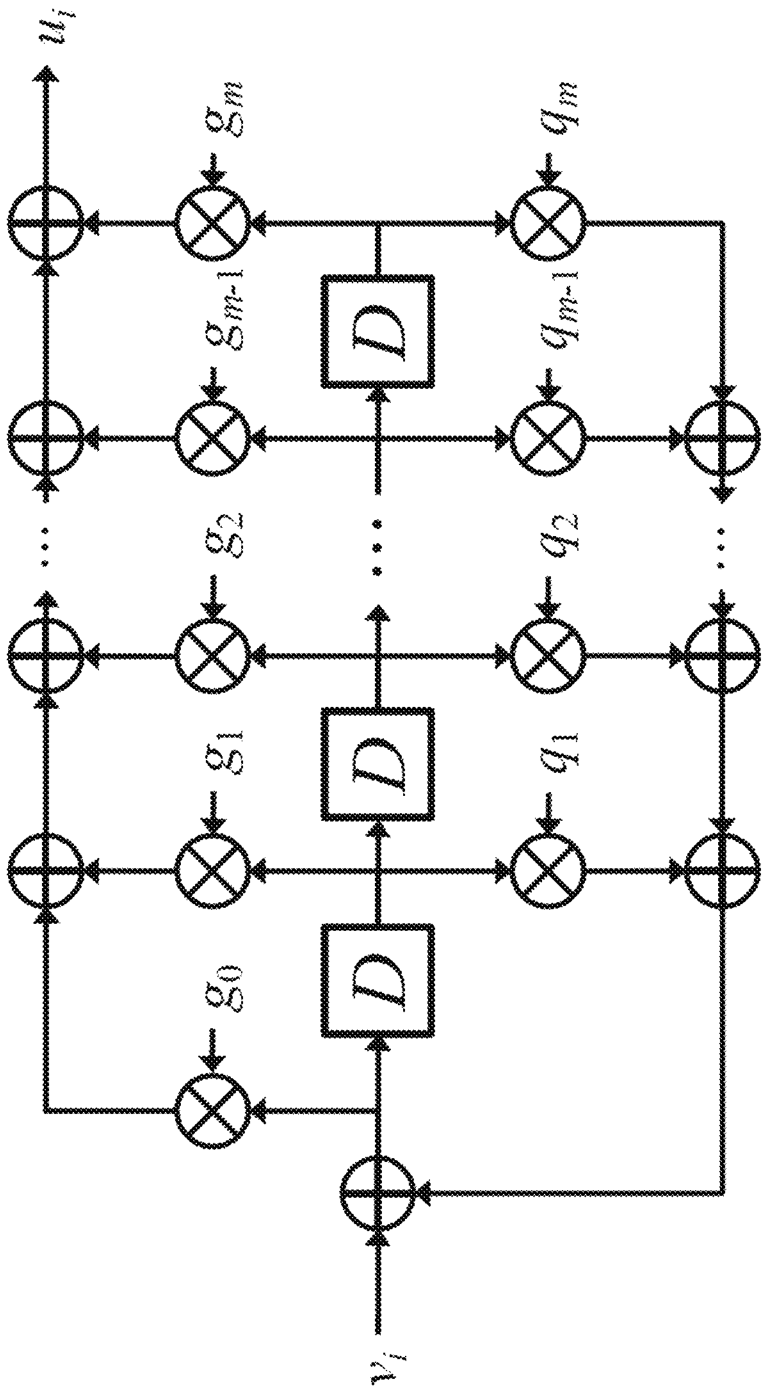
FIG. 6 shows a diagram for a pre-transform defined by both a generator polynomial g(D) and a recursive feedback polynomial q(D).

FIG. 6 shows a diagram of a pre-transform using both a generator polynomial $g(D)=g_0+g_1\cdot D+ \ldots +g_{m-1}\cdot D^{m-1}+ g_m\cdot D^m$ and a recursive feedback polynomial q(D) (or equivalently both a generator bit sequence g and a recursive feedback bit sequence q), wherein the pre-transform determines a bit $u_i$ with an index i in a pre-transform output bit sequence u comprising setting, by the first node, a bit $t_0$ with an index 0 in a state bit sequence $t=[t_0, t_1, t_2, \ldots, t_m]$ to be a bit $v_i$ with an index i of a pre-transform input bit sequence $v=[v_0, v_1, v_2, \ldots, v_{N-1}]$, i.e., $t_0=v_i$; and determining, by the first node, a summation bit s by the recursive feedback polynomial $q(D)=q_0+q_1\cdot D+ \ldots +q_m\cdot D^m$ (or equivalently the feedback bit sequence $q=[q_0, q_1, \ldots, q_m]$) over GF(2) and the updated state bit sequence $t=[t_0, t_1, t_2 \ldots, t_{m-1}, t_m]$ as $$s = \mathrm{mod}\left(\sum\nolimits_{j=0}^{m} q_j \cdot t_j, 2\right), \text{ and}$$

setting, by the first node, a bit $t_0$ with an index 0 in the state bit sequence $t=[t_0, t_1, t_2 \ldots, t_{m-1}, t_m]$ to the summation bit s, i.e., $t_0=s$, and determining, by the first node, a bit $u_i$ with an index i of a pre-transform output bit sequence $u=[u_0, u_1, u_2, \ldots, u_{N-1}]$ by a generator polynomial $g(D)=g_0+ g_1\cdot D+ \ldots +g_m\cdot D^m$ (or equivalently a generator bit sequence $g=[g_0, g_1, \ldots, g_m]$) over GF(2) and the updated state bit sequence $t=[t_0, t_1, \ldots, t_{m-1}, t_m]$ as $$u_i = \mathrm{mod}\left(\sum\nolimits_{j=0}^{m} g_j \cdot t_j, 2\right).$$

performing, by the first node, a right shift on the state bit sequence $t=[t_0, t_1, \ldots, t_{m-1}, t_m]$ with a bit $t_0$ with index 0 in the state bit sequence $t=[t_0, t_1, \ldots, t_{m-1}, t_m]$ is set to 0 as follows.

```
For j = m to 1
   t_j = t_{j-1};
End for
t_0 = 0;
```

A specific pseudo code for the above steps is as follows.

```
For j = 0 to m
   t_j = 0;
End for
k = 0;
For i = 0 to N-1
      s = 0;
      t_0 = v_i,
      For j = 0 to m
         s = mod(s + q_j·t_j, 2);
      End for
      t_0 = s;
      u_i = 0;
      For j = 0 to m
         u_i = mod(u_i + g_j·t_j, 2);
      End for
```

-continued

```
        For j = m to 1
           t_j = t_{j-1};
        End for
    End for
```

Embodiment 9

This section discloses examples involving the pre-transform input bit sequence is a rate profiling output bit sequence.

Embodiment 9 is based on the above related embodiments.

In some embodiments, the pre-transform input bit sequence $v=[v_0, v_1, \ldots, v_{N-1}]$ is a rate profiling output bit sequence of length N determined by a rate profiling, wherein specific examples are given in FIGS. 4C, 4D, 4G, and 4H.

Embodiment 10

This section discloses examples involving the polar transform input bit sequence is an rate profiling output bit sequence.

Embodiment 10 is based on the above related embodiments.

In some embodiments, the polar transform input bit sequence $u=[u_0, u_1, \ldots, u_{N-1}]$ is equal to an rate profiling output bit sequence $v=[v_0, v_1, \ldots, v_{N-1}]$ of length N determined by a rate profiling, wherein, u=v, N is the polar matrix size, and specific examples are given in FIGS. 4A, 4B, 4E, and 4F.

Embodiment 11

This section discloses examples involving a rate profiling block.

Embodiment 11 is based on the above embodiments.

The rate profiling determining the rate profiling output bit sequence $v=[v_0, v_1, \ldots, v_{N-1}]$ comprises obtaining, by the first node, a rate profiling input bit sequence; and determining, by the first node, a rate profiling output bit sequence $v=[v_0, v_1, \ldots, v_{N-1}]$ according to a date index set Q of size K; wherein, K is the input bit sequence length; the rate profiling input bit sequence is the input bit sequence $c=[c_0, c_1, \ldots, c_{K-1}]$ of length K; specific examples are given in FIGS. 4A to 4H.

Description of the Data Index Set Q

In some embodiments, the data index set Q is a subset of a first integer set $Z_N=\{0, 1, 2, \ldots, N-2, N-1\}$, wherein, the first integer set $Z_N=\{0, 1, 2, \ldots, N-2, N-1\}$ comprises and only comprises all non-negative integers smaller than N. The data index set $Q=\{Q_0, Q_1, \ldots, Q_{K-2}, Q_{K-1}\}$ has K non-negative elements $Q_0, Q_1, \ldots, Q_{K-2}, Q_{K-1}$, i.e., the data index set Q is of size K.

In some embodiments, for k=0, 1, . . . , K−2, the element $Q_k$ in the data index set Q is smaller than $Q_{k+1}$, i.e., the data index set is sorted in ascending order according to index values with $Q_0<Q_1< \ldots <Q_{K-2}<Q_{K-1}$. In some embodiments, for k=0, 1, . . . , K−2, the element $Q_k$ in the data index set Q is greater than $Q_{k+1}$, i.e., the data index set is sorted in descending order according to index values with $Q_0> Q_1> \ldots >Q_{K-2}>Q_{K-1}$.

In some embodiments, for k=0, 1, . . . , K−2, the reliability of the $Q_k$-th polarized sub-channel (denoted as $W(Q_k)$) is smaller than the reliability of the $Q_{k+1}$-th polarized sub-channel (denoted as $W(Q_{k+1})$), i.e., the data index set is sorted in ascending order according to the polarized sub-channel reliability with $W(Q_0)<W(Q_1)< \ldots <W(Q_{K-2})<W(Q_{K-1})$. In some embodiments, for k=0, 1, . . . , K−2, the reliability of the $Q_k$-th polarized sub-channel (denoted as $W(Q_k)$) is greater than the reliability of the $Q_{k+1}$-th polarized sub-channel (denoted as $W(Q_{k+1})$), i.e., the data index set is sorted in descending order according to the polarized sub-channel reliability with $W(Q_0)>W(Q_1)> \ldots >W(Q_{K-2})>W(Q_{K-1})$.

In a first specific example with N=8 and K=4, a data index set is $Q=\{Q_0, Q_1, Q_2, Q_3\}=\{3, 5, 6, 7\}$. In a second specific example with N=8 and K=4, a data index set is $Q=\{Q_0, Q_1, Q_2, Q_3\}=\{7, 6, 5, 3\}$.

In a third specific example with N=32 and K=25, a data index set is $Q=\{Q_0, Q_1, Q_2, Q_3, Q_4, Q_5, Q_6, Q_7, Q_8, Q_9, Q_{10}, Q_{11}, Q_{12}, Q_{13}, Q_{14}, Q_{15}, Q_{16}, Q_{17}, Q_{18}, Q_{19}, Q_{20}, Q_{21}, Q_{22}, Q_{23}, Q_{24}\}=\{5, 9, 6, 17, 10, 18, 12, 20, 24, 7, 11, 19, 13, 14, 21, 26, 25, 22, 28, 15, 23, 31, 27, 29, 30\}$ with polarized sub-channel reliability with $W(Q_0)<W(Q_1)<W(Q_2)<W(Q_3)<W(Q_4)<W(Q_5)<W(Q_6)<W(Q_7)<W(Q_8)<W(Q_9)<W(Q_{10})<W(Q_{11})<W(Q_{12})<W(Q_{13})<W(Q_{14})<W(Q_{15})<W(Q_{16})<W(Q_{17})<W(Q_{18})<W(Q_{19})<W(Q_{20})<W(Q_{21})<W(Q_{22})<W(Q_{23})<W(Q_{24})$. In a fourth specific example with N=32 and K=6, a data index set is $Q=\{Q_0, Q_1, Q_2, Q_3, Q_4, Q_5\}=\{30, 29, 27, 31, 23, 15\}$ with polarized sub-channel reliability with $W(Q_0)>W(Q_1)>W(Q_2)>W(Q_3)>W(Q_4)>W(Q_5)$.

In some embodiments, the rate profiling determines the rate profiling output bit sequence $v=[v_0, v_1, \ldots, v_{N-1}]$ corresponding to the rate profiling input bit sequence $c=[c_0, c_1, \ldots, c_{K-1}]$ according to the data index set Q is as follows.

```
For each index i = 0, 1, ..., N-1,
    if the index i belongs to the data index set Q, the i-th bit v_i
    in the rate profiling
  output bit sequence v is set to a bit in the rate profiling input
  bit sequence c;
    if the index i does not belongs to the data index set Q, the
    i-th bit v_i in the rate
  profiling output bit sequence v is set to a bit zero ("0");
End for
```

A specific example pseudo-code for the rate profiling is as follows.

```
k = 0;
For i = 0 to N - 1
  If i ∈ Q
    v_i = c_k;
    k = k + 1;
  Else
    v_i = 0;
  End if
End for
```

In some embodiments, the rate profiling output bit sequence v is the multiplexing of the rate profiling input bit sequence c and the rate profiling frozen bit sequence f, wherein the rate profiling frozen bit sequence f is of length N−K; N is the polar matrix size and K is the rate profiling input bit sequence length.

A first specific example with N=8 and K=3 is a rate profiling input bit sequence $c=[c_0, c_1, c_2]$ and a rate profiling frozen bit sequence $f=[f_0, f_1, f_2, f_3, f_4]$, then a rate profiling output bit sequence $v=[v_0, v_1, v_2, v_3, v_4, v_5, v_6, v_7]=[f_0, f_1, f_2, f_3, f_4, c_0, c_1, c_2]$.

A second specific example with N=16 and K=4 is a rate profiling input bit sequence $c=[c_0, c_1, c_2, c_3]$ and a rate profiling frozen bit sequence $f=[f_0, f_1, f_2, f_3, f_4, f_5, f_6, f_7, f_8, f_9, f_{10}, f_{11}]$, then a rate profiling output bit sequence $v=[v_0, v_1, v_2, v_3, v_4, v_5, v_6, v_7, v_8, v_9, v_{10}, v_{11}, v_{12}, v_{13}, v_{14}, v_{15}]=[f_0, f_1, f_2, f_3, f_4, f_5, f_6, f_7, f_8, f_9, f_{10}, c_0, f_{11}, c_1, c_2, c_3]$.

A third specific example is given in Algorithm 1A in TABLE 2.

In some embodiments, for an index i belonging to the data index set Q, the bit $v_i$ in the rate profiling output bit sequence v is a bit in the rate profiling input bit sequence c.

A first specific example with N=8, K=3 and a data index set Q={5, 6, 7}, a rate profiling input bit sequence $c=[c_0, c_1, c_2]$, the bits $v_5$, $v_6$, $v_7$ with indices belonging to the data index set Q={5, 6, 7} in a rate profiling output bit sequence $v=[v_0, v_1, v_2, v_3, v_4, v_5, v_6, v_7]$ is set as $v_5=c_0$, $v_6=c_1$, and $v_7=c_2$.

A second specific example with N=16, K=4 and a data index set Q={11, 13, 14, 15}, a rate profiling input bit sequence $c=[c_0, c_1, c_2, c_3]$, the bits $v_{11}$, $v_{13}$, $v_{14}$, $v_{15}$ with indices belonging to the data index set Q={11, 13, 14, 15} in a rate profiling output bit sequence $v=[v_0, v_1, v_2, v_3, v_4, v_5, v_6, v_7, v_8, v_9, v_{10}, v_{11}, v_{12}, v_{13}, v_{14}, v_{15}]$ is set as $v_{11}=c_0$, $v_{12}=c_1$, $v_{13}=c_2$, and $v_{14}=c_3$.

A third specific example is given in Algorithm 1A in TABLE 2.

A fourth specific example is given in Algorithm 1B in TABLE 2.

In some embodiments, for an index i not belonging to the data index set Q, the bit $v_i$ in the rate profiling output bit sequence v is a bit in the rate profiling frozen bit sequence f. A first specific example with N=8, K=3 and Q={5, 6, 7}, a rate profiling frozen bit sequence $f=[f_0, f_1, f_2, f_3, f_4]$, the bits $v_0$, $v_1$, $v_2$, $v_3$, $v_4$ with indices not belonging to the data index set Q={5, 6, 7} in a rate profiling output bit sequence $v=[v_0, v_1, v_2, v_3, v_4, v_5, v_6, v_7]$ is set as $v_0=f_0$, $v_1=f_1$, $v_2=f_2$, $v_3=f_3$, and $v_4=f_4$.

A second specific example with N=16, K=4 and Q={11, 13, 14, 15}, a rate profiling frozen bit sequence $f=[f_0, f_1, f_2, f_3, f_4, f_5, f_6, f_7, f_8, f_9, f_{10}, f_{11}]$, the bits $v_0, v_1, v_2, v_3, v_4, v_5, v_6, v_7, v_8, v_9, v_{10}, v_{12}$ with indices not belonging to the data index set Q={11, 13, 14, 15} in a rate profiling output bit sequence $v=[v_0, v_1, v_2, v_3, v_4, v_5, v_6, v_7, v_8, v_9, v_{10}, v_{11}, v_{12}, v_{13}, v_{14}, v_{15}]$ is set as $v_0=f_0$, $v_1=f_1$, $v_2=f_2$, $v_3=f_3$, $v_4=f_4$, $v_5=f_5$, $v_6=f_6$, $v_7=f_7$, $v_8=f_8$, $v_9=f_9$, $v_{10}=f_{10}$, and $v_{12}=f_{11}$.

A third specific example is given in Algorithm 1A in TABLE 2.

In some embodiments, the rate profiling output bit sequence v is the multiplexing of the rate profiling input bit sequence c and an all-zero sequence of length N−K, wherein N is the polar matrix size and K is the rate profiling input bit sequence length.

A first specific example with N=8 and K=3 is a rate profiling input bit sequence $c=[c_0, c_1, c_2]$ and an all-zero sequence of length N−K=8−3=5, then a rate profiling output bit sequence $v=[v_0, v_1, v_2, v_3, v_4, v_5, v_6, v_7]=[0, 0, 0, 0, 0, c_0, c_1, c_2]$.

A second specific example with N=16 and K=4 is a rate profiling input bit sequence $c=[c_0, c_1, c_2, c_3]$ and an all-zero sequence of length N−K=16−4=12, then a rate profiling output bit sequence $v=[v_0, v_1, v_2, v_3, v_4, v_5, v_6, v_7, v_8, v_9, v_{10}, v_{11}, v_{12}, v_{13}, v_{14}, v_{15}]=[0, 0, 0, 0, 0, 0, 0, 0, 0, 0, 0, c_0, 0, c_1, c_2, c_3]$.

A third specific example is given in Algorithm 1B in TABLE 2.

In some embodiments, for an index i not belonging to the data index set Q, the bit $v_i$ in the rate profiling output bit sequence v is equal to 0.

A first specific example with N=8, K=3 and Q={5, 6, 7}, the bits $v_0$, $v_1$, $v_2$, $v_3$, $v_4$ with indices not belonging to the data index set Q={5, 6, 7} in a rate profiling output bit sequence $v=[v_0, v_1, v_2, v_3, v_4, v_5, v_6, v_7]$ is set as $v_0=0$, $v_1=0$, $v_2=0$, $v_3=0$, and $v_4=0$.

A second specific example with N=16, K=4 and Q={11, 13, 14, 15}, the bits $v_0, v_1, v_2, v_3, v_4, v_5, v_6, v_7, v_8, v_9, V_{10}, v_{12}$ with indices not belonging to the data index set Q={11, 13, 14, 15} in a rate profiling output bit sequence $v=[v_0, v_1, v_2, v_3, v_4, v_5, v_6, v_7, v_8, v_9, v_{10}, v_{11}, v_{12}, v_{13}, v_{14}, v_{15}]$ is set as $v_0=0$, $v_1=0$, $v_2=0$, $v_3=0$, $v_4=0$, $v_5=0$, $v_6=0$, $v_7=0$, $v_8=0$, $v_9=0$, $v_{10}=0$, and $v_{12}=0$.

A third specific example is given in Algorithm 1B in TABLE 2.

TABLE 2

| Algorithm 1A and Algorithm 1B | |
|---|---|
| Algorithm 1A | Algorithm 1B |
| k = 0;<br>For i = 0 to N-1<br>  If i ∈ Q<br>    $v_i = c_k$;<br>    k = k + 1;<br>  Else<br>    $v_i = f_{i-k}$;<br>  End if<br>End for | k = 0;<br>For i = 0 to N-1<br>  If i ∈ Q<br>    $v_i = c_k$;<br>    k = k + 1;<br>  Else<br>    $v_i = 0$;<br>  End if<br>End for |

Embodiment 12

This section discloses examples involving the second part bit sequence is a repetition of a portion of the input bit sequence.

Embodiment 12 is based on the above embodiments.

The second part bit sequence $c'=[c'_0, c'_1, c'_2, \ldots, c'_{E-N-1}]$ is a repetition of a portion of the input bit sequence $c=[c_0, c_1, c_2, \ldots, c_{K-1}]$, wherein, the second part bit sequence $c'=[c'_0, c'_1, c'_2, \ldots, c'_{N-E-1}]$ is determined by a repetition with the input bit sequence $c=[c_0, c_1, c_2, \ldots, c_{K-1}]$ as input; wherein specific examples are given in FIGS. 4E, 4F, 4G, and 4H.

A Repetition by a Portion of the Input Bit Sequence c

In some embodiments, a repetition comprises obtaining, by the first node, a portion of the input bit sequence c of length Nb; and determining, by the first node, the second part bit sequence c' based on the portion of the input bit sequence c of length Nb as $$c'_r = c_{mod(r,NB)},\ r = 0, 1, 2, \ldots, E-N-1.$$

Here, Nb can be any positive integer not greater than K; Nb is the length of the portion of the input bit sequence c; the portion of the input bit sequence c is $[c_0, c_1, c_2, \ldots, c_{Nb-1}]$, i.e., the first Nb bits in the input bit sequence c.

In some embodiments, the length Nb of the portion of the input bit sequence c is determined by the input sequence length K and a repetition ratio ρ, wherein the repetition ratio ρ is a positive real number not greater than one.

A first specific example with example number 1 in TABLE 3 is the length of the portion of the input bit sequence c being Nb=K·ρ.

A second specific example with example number 2 in TABLE 3 is the length of the portion of the input bit sequence c being Nb=floor(K·ρ).

A third specific example with example number 3 in TABLE 3 is the length of the portion of the input bit sequence c being Nb=ceil(K·ρ).

A fourth specific example with example number 4 in TABLE 3 is the length of the portion of the input bit sequence c being Nb=round(K·ρ).

A fifth specific example with example number 5 in TABLE 3 is the length of the portion of the input bit sequence c being Nb=K.

TABLE 3

Specific example of the length Nb and the portion of the input bit sequence c

| Example Number | K | E | N | ρ | Nb | c = [$c_0$, $c_1$, ..., $c_{Nb-1}$] | c' = [$c'_0$, $c'_1$, ..., $c'_{E-N-1}$] |
|---|---|---|---|---|---|---|---|
| 1 | 4 | 11 | 8 | 0.5 | K·ρ = 2 | [$c_0$, $c_1$] | [$c_0$, $c_1$, $c_0$] |
| 2 | 4 | 11 | 8 | 0.7 | floor(K·ρ) = 2 | [$c_0$, $c_1$] | [$c_0$, $c_1$, $c_0$] |
| 3 | 4 | 10 | 8 | 0.6 | ceil(K·ρ) = 3 | [$c_0$, $c_1$, $c_2$] | [$c_0$, $c_1$] |
| 4 | 4 | 13 | 8 | 0.6 | round(K·ρ) = 2 | [$c_0$, $c_1$] | [$c_0$, $c_1$, $c_0$, $c_1$, $c_0$] |
| 5 | 4 | 13 | 8 | 0.6 | round(K·ρ) = 2 | [$c_0$, $c_1$, $c_2$, $c_3$] | [$c_0$, $c_1$, $c_2$, $c_3$, $c_0$] |

A Repetition According to the Binary Representation of the Output Bit Sequence Length E In some embodiments, a repetition comprises obtaining, by the first node, a portion of the input bit sequence c=[$c_0$, $c_1$, $c_2$, . . . , $c_{K-1}$]; determining, by the first node, n+1 bits $$b_n^{(E)}, b_{n-1}^{(E)}, \ldots , b_2^{(E)}, b_1^{(E)}, b_0^{(E)}$$

being binary representation of the output bit sequence length E, i.e., $$E=\sum_{i=0}^{n} b_i^{(E)} \cdot 2^i$$

with N=$2^n$; and determining, by the first node, a second part bit sequence c' such that the second part bit sequence c' is a concatenation of n repetition sub-sequences $$c'^{(n-1)}, c'^{(n-2)}, \ldots , c'^{(1)}, c'^{(0)}, \text{ i.e.,}$$

$$c'=\left[c'^{(n-1)}, c'^{(n-2)}, \ldots , c'^{(1)}, c'^{(0)}\right] \text{ or } c'=\left[c'^{(0)}, c'^{(1)}, \ldots , c'^{(n-2)}, c'^{(n-1)}\right].$$

Here, N is the polar matrix size; for i=0, 1, . . . , n−1, the i-th repetition sub-sequence $c'^{(i)}$ is of length $$E_i = b_i^{(E)} \cdot 2^i;$$

wherein, if $$b_i^{(E)} = 0,$$

the i-th repetition sub-sequences is an empty bit sequence; if $$b_i^{(E)} = 1,$$

the i-th repetition sub-sequence $c'^{(i)}$ is obtained by determining, by the first node, the i-th repetition sub-sequence $c'^{(i)}$ based on the portion of the input bit sequence c of length Nb as $$c_r'^{(i)} = c_{mod(r,Nb)},\ r=0, 1, 2, \ldots , E_i - 1;$$

wherein, Nb can be any positive integer not greater than K; Nb is the length of the portion of the input bit sequence c; the portion of the input bit sequence c is [$c_0$, $c_1$, $c_2$, . . . , $c_{Nb-1}$], i.e., the first Nb bits in the input bit sequence c.

A first specific example with parameters K=7, N=32, E=44, Nb=K=7, an input bit sequence c=[$c_0$, $c_1$, $c_2$, $c_3$, $c_4$, $c_5$, $c_6$, $c_7$], the second part bit sequence c' is determined as follows.

(1) Determine n=$\log_2$(N)=5 and the n+1=6 bits binary representation of the output bit sequence length $$E = 44 \text{ is } \left[b_5^{(E)}, b_4^{(E)}, b_3^{(E)}, b_2^{(E)}, b_1^{(E)}, b_0^{(E)}\right] = \left[b_5^{(44)}, b_4^{(44)}, b_3^{(44)}, b_2^{(44)}, b_1^{(44)}, b_0^{(44)}\right] = [1,\ 0,\ 1,\ 1,\ 0,\ 0];$$

(2) Determine lengths of n=5 repetition sub-sequences $c'^{(4)}$, $c'^{(3)}$, $c'^{(2)}$, $c'^{(1)}$, $c'^{(0)}$ are as follows.

$$E_4 = b_4^{(44)} \cdot 2^4 = 0,$$

$$E_3 = b_3^{(44)} \cdot 2^3 = 8,$$

$$E_2 = b_2^{(44)} \cdot 2^2 = 4,$$

$$E_1 = b_1^{(44)} \cdot 2^1 = 0,$$

$$E_0 = b_0^{(44)} \cdot 2^0 = 0,$$

(3) Determine n=5 repetition sub-sequences $c'^{(4)}$, $c'^{(3)}$, $c'^{(2)}$, $c'^{(1)}$, $c'^{(0)}$ are as follows.

$$c'^{(4)} = [],$$

$$c'^{(3)} = \left[c_0'^{(3)}, c_1'^{(3)}, \ldots , c_{E_3-1}'^{(3)}\right] = \left[c_0'^{(3)}, c_1'^{(3)}, \ldots , c_6'^{(3)}, c_7'^{(3)}\right] = [c_0, c_1, c_2, c_3, c_4, c_5, c_6, c_7],$$

$$c'^{(2)} = \left[c_0'^{(2)}, c_1'^{(2)}, \ldots , c_{E_2-1}'^{(2)}\right] = \left[c_0'^{(2)}, c_1'^{(2)}, c_2'^{(2)}, c_3'^{(2)}\right] = [c_0, c_1, c_2, c_3],$$

$$c'^{(1)} = [],$$

$$c'^{(0)} = [];$$

(4) Concatenate n=5 repetition sub-sequences $c'^{(4)}$, $c'^{(3)}$, $c'^{(2)}$, $c'^{(1)}$, $c'^{(0)}$ into the second part bit sequence $$c' = \left[c'^{(4)}, c'^{(3)}, c'^{(2)}, c'^{(1)}, c'^{(0)}\right] = \left[c_0'^{(3)}, c_1'^{(3)}, c_2'^{(3)}, \dots , c_6'^{(3)}, c_7'^{(3)}, c_0'^{(2)}, c_1'^{(2)}, c_2'^{(2)}, c_3'^{(2)}\right] = [c_0, c_1, c_2, c_3, c_4, c_5, c_6, c_7, c_0, c_1, c_2, c_3]$$

of length E−N=4−32=12.

A second specific example with parameters K=7, N=32, E=44, Nb=5, an input bit sequence $c=[c_0, c_1, c_2, c_3, c_4, c_5, c_6, c_7]$, the second part bit sequence c' is determined as follows.

(1) Determine $n=\log_2(N)=5$ and the n+1=6 bits binary representation of the output bit sequence length $$E = 44 \text{ is } \left[b_5^{(E)}, b_4^{(E)}, b_3^{(E)}, b_2^{(E)}, b_1^{(E)}, b_0^{(E)}\right] = \left[b_5^{(44)}, b_4^{(44)}, b_3^{(44)}, b_2^{(44)}, b_1^{(44)}, b_0^{(44)}\right] = [1,\ 0,\ 1,\ 1,\ 0,\ 0];$$

(2) Determine lengths of n=5 repetition sub-sequences $c'^{(4)}$, $c'^{(3)}$, $c'^{(2)}$, $c'^{(1)}$, $c'^{(0)}$ as $$E_4 = b_4^{(44)} \cdot 2^4 = 0,$$
$$E_3 = b_3^{(44)} \cdot 2^3 = 8,$$
$$E_2 = b_2^{(44)} \cdot 2^2 = 4,$$
$$E_1 = b_1^{(44)} \cdot 2^1 = 0,$$
$$E_0 = b_0^{(44)} \cdot 2^0 = 0;$$

(3) Determine n=5 repetition sub-sequences $c'^{(4)}$, $c'^{(3)}$, $c'^{(2)}$, $c'^{(1)}$, $c'^{(0)}$ as $$c'^{(4)} = [],$$
$$c'^{(3)} = \left[c_0'^{(3)}, c_1'^{(3)}, \dots , c_{E_3-1}'^{(3)}\right] = \left[c_0'^{(3)}, c_1'^{(3)}, \dots , c_6'^{(3)}, c_7'^{(3)}\right] = [c_0, c_1, c_2, c_3, c_4, c_0, c_1, c_2],$$
$$c'^{(2)} = \left[c_0'^{(2)}, c_1'^{(2)}, \dots , c_{E_2-1}'^{(2)}\right] = \left[c_0'^{(2)}, c_1'^{(2)}, c_2'^{(2)}, c_3'^{(2)}\right] = [c_0, c_1, c_2, c_3],$$
$$c'^{(1)} = [],$$
$$c'^{(0)} = [];$$

(4) Concatenate n=5 repetition sub-sequences $c'^{(4)}$, $c'^{(3)}$, $c'^{(2)}$, $c'^{(1)}$, $c'^{(0)}$ into the second part bit sequence c', i.e., $$c' = \left[c'^{(0)}, c'^{(1)}, c'^{(2)}, c'^{(3)}, c'^{(4)}\right] = \left[c_0'^{(2)}, c_1'^{(2)}, c_2'^{(2)}, c_3'^{(2)}, c_0'^{(3)}, c_1'^{(3)}, c_2'^{(3)}, \dots , c_6'^{(3)}, c_7'^{(3)}\right] = [c_0, c_1, c_2, c_3, c_0, c_1, c_2, c_3, c_4, c_0, c_1, c_2]$$

of length E−N=44−32=12.

a Repetition According to a Repetition Index Sequence R with Elements Less than K In some embodiments, a repetition comprises obtaining, by the first node, a portion of the input bit sequence c; and determining, by the first node, the second part bit sequence c' according to a repetition index sequence $R=[R_0, R_1, \dots, R_{Nr-2}, R_{Nr-1}]$ of length Nr as $$c_r' = c_{R_r},\ r = 0, 12, \dots , Nr,$$

Here, Nr=E−N is the repetition index sequence length; for r=0, 1, 2, . . . , Nr−1, $R_r$ is a non-negative integer smaller than K, i.e., $0 \le R_r < K$; wherein, K is the input bit sequence length; N is the polar matrix size; E is the output bit sequence length.

A first specific example with the input bit sequence length K=4, the polar matrix size N=8, the output bit sequence length E=11, the repetition index sequence length Nr=E−N=11−8=3, and the repetition index sequence $R=[R_0, R_1, \dots, R_{Nr-2}, R_{Nr-1}]=[R_0, R_1, R_2]=[3, 0, 1]$, the second part bit sequence $c'=[c'_0, c'_1, \dots, c'_{N-E-1}]=[c'_0, c'_1, c'_2]=[c_3, c_0, c_1]$.

A second specific example with the input bit sequence length K=4, the polar matrix size N=8, the output bit sequence length E=11, the repetition index sequence length Nr=E−N=11−8=3, and the repetition index sequence $R=[R_0, R_1, \dots, R_{Nr-2}, R_{Nr-1}]=[R_0, R_1, R_2]=[0, 0, 1]$, the second part bit sequence $c'=[c'_0, c'_1, \dots, c'_{N-E-1}]=[c'_0, c'_1, c'_2]=[c_0, c_0, c_1]$.

A third specific example with the input bit sequence length K=4, the polar matrix size N=8, the output bit sequence length E=14, the repetition index sequence length Nr=E−N=14−8=6, and the repetition index sequence $R=[R_0, R_1, \dots, R_{Nr-2}, R_{Nr-1}]=[R_0, R_1, R_2, R_3, R_4, R_5]=[0, 0, 1, 2, 2, 2]$, the second part bit sequence $c'=[c'_0, c'_1, \dots, c'_{N-E-1}]=[c'_0, c'_1, c'_2, c'_3, c'_4, c'_5]=[c_0, c_0, c_1, c_2, c_2, c_2]$.

A Repetition According to a Repetition Index Sequence R with Elements Less than K and a Repetition Number Sequence T In some embodiments, a repetition comprises obtaining, by the first node, the portion of the input bit sequence c; and determining, by the first node, the second part bit sequence c' according to a repetition index sequence $R=[R_0, R_1, \dots, R_{Nr-2}, R_{Nr-1}]$ of length Nr and a repetition number sequence $T=[T_0, T_1, \dots, T_{Nr-2}, T_{Nr-1}]$ of length Nr such that for r=0, 1, 2, . . . , Nr, the second part bit sequence c' comprises $T_r$ copies of the $R_r$-th bit $c_{R_r}$ in the portion of the input bit sequence c.

A specific example for a repetition of a second part bit sequence c' corresponding to a portion of the input bit sequence c, a repetition index sequence $R=[R_0, R_1, \dots, R_{Nr-2}, R_{Nr-1}]$ and a repetition number sequence $T=[T_0, T_1, \dots, T_{Nr-2}, T_{Nr-1}]$ is as follows $$[c_0', c_1', \dots , c_{E-N-1}'] = \Bigg[\underbrace{c_{R_0}, \dots , c_{R_0}}_{T_0 \text{ copies}}, \underbrace{c_{R_1}, \dots , c_{R_1}}_{T_1 \text{ copies}}, \dots , \underbrace{c_{R_{Nr-2}}, \dots , c_{R_{Nr-2}}}_{T_{Nr-2} \text{ copies}}, \underbrace{c_{R_{Nr-1}}, \dots , c_{R_{Nr-1}}}_{T_{Nr-1} \text{ copies}}\Bigg]$$

Here, Nr is a positive integer not greater than the input bit sequence length K; for r=0, 1, 2, . . . , Nr−1, $R_r$ is a non-negative integer smaller than K, i.e., $0 \le R_r < K$; for any two indices r0≠r1 but $R_{r0} \ne R_{r1}$; for r=0, 1, 2, . . . , Nr, the element $T_r$ in the repetition number sequence $T=[T_0, T_1, \dots, T_{Nr-2}, T_{Nr-1}]$ is a positive integer; the summation of elements in the repetition number sequence $T=[T_0, T_1, \ldots, T_{Nr-2}, T_{Nr-1}]$ is equal to E−N, i.e., $$\sum_{r=0}^{Nr-1} T_r = E - N;$$

wherein K is the input bit sequence length, N is the polar matrix size, and, E is the output bit sequence length.

A first specific examples with K=4, N=8, E=14, a repetition index sequence $R=[R_0, R_1, R_2]=[2, 3, 1]$ of length Nr=3, and a repetition number sequence $T=[T_0, T_1, \ldots, T_{Nr-1}]=[2, 1, 3]$ of size Nr=3 with $T_0+T_1+T_2=2+1+3=6=E-N=14-8$, a second part bit sequence $c'=[c'_0, c'_1, \ldots, c'_{E-N-1}]=[c'_0, c'_1, c'_2, c'_3, c'_4, c'_5]=[c_2, c_2, c_3, c_1, c_1, c_1]$ corresponding to a portion of the input bit sequence $c=[c_0, c_1, c_2, c_3]$.

A second specific examples with K=4, N=8, E=13, a repetition index sequence $R=[R_0, R_1, R_2]=[2, 3, 1]$ of length Nr=3, and a repetition number sequence $T=[T_0, T_1, \ldots, T_{Nr-1}]=[2, 1, 2]$ of size Nr=3 with $T_0+T_1+T_2=2+1+2=5=E-N=13-8$, a second part bit sequence $c'=[c'_0, c'_1, \ldots, c'_{E-N-}1]=[c'_0, c'_1, c'_2, c'_3, c'^4]=[c_2, c_2, c_3, c_1, c_1]$ corresponding to a portion of the input bit sequence $c=[c_0, c_1, \ldots, c_{K-1}]=[c_0, c_1, c_2, c_3]$.

Here, Nq can be any positive integer not greater than K with K being the input bit sequence length; Nq is the size of the portion of the data index set Q; the portion of the data index set Q is $\{Q_0, Q_1, Q_2, \ldots, Q_{Nq-1}\}$, i.e., the first Nq indices in the data index set Q; the data index set Q is the same as that in the rate profiling.

In some embodiments, the size Nq of the portion of the data index set Q is determined by the input sequence length K and a repetition ratio ρ, wherein the repetition ratio ρ is a positive real number not greater than one. A first specific example with example number 1 in TABLE 4 is the size of the portion of the data index set Q being Nq=K·ρ. A second specific example with example number 2 in TABLE 4 is the size of the portion of the data index set Q being Nq=floor (K·ρ). A third specific example with example number 3 in TABLE 4 is the size of the portion of the data index set Q being Nq=ceil(K·ρ). A fourth specific example with example number 4 in TABLE 4 is the size of the portion of the data index set Q being Nq=round(K·ρ). A fifth specific example with example number 5 in TABLE 4 is the size of the portion of the data index set Q being Nq=K.

TABLE 4

Specific examples for a repetition with parameters K = 4, N = 8 and $v = [v_0, v_1, \ldots, v_{N-1}] = [v_0, v_1, v_2, v_3, v_4, v_5, v_6, v]$ as input

| Example Number | E | ρ | $Q = \{Q_0, Q_1, \ldots, Q_{K-1}\}$ | Nq | $\{Q_0, Q_1, \ldots, Q_{Nq-1}\}$ | $c' = [c'_0, c'_1, \ldots, c'_{E-N-1}]$ |
|---|---|---|---|---|---|---|
| 1 | 11 | 0.5 | {3, 5, 6, 7} | K·ρ = 2 | {3, 5} | $[v_3, v_5, v_3]$ |
| 2 | 11 | 0.7 | {3, 5, 6, 7} | floor(K·ρ) = 2 | {3, 5} | $[v_3, v_5, v_3]$ |
| 3 | 10 | 0.6 | {3, 5, 6, 7} | ceil(K·ρ) = 3 | {3, 5, 6} | $[v_3, v_5]$ |
| 4 | 13 | 0.6 | {3, 5, 6, 7} | round(K·ρ) = 2 | {3, 5} | $[v_3, v_5, v_3, v_5, v_3]$ |
| 5 | 13 | 0.6 | {3, 5, 6, 7} | K = 4 | {3, 5, 6, 7} | $[v_3, v_5, v_6, v_7, v_3]$ |

Embodiment 13

This section discloses examples involving the second part bit sequence is a repetition of a portion of the rate profiling output bit sequence.

Embodiment 13 is based on the above related embodiments.

The second part bit sequence $c'=[c'_0, c'_1, c'_2, \ldots, c'_{E-N-1}]$ is a repetition of a portion of the rate profiling output bit sequence $v=[v_0, v_1, v_2, \ldots, v_{N-1}]$ of length N, wherein, N is the polar matrix size; E is the output bit sequence length; the second part bit sequence $c'=[c'_0, c'_1, c'_2, \ldots, c'_{N-E-1}]$ is determined by a repetition with the rate profiling output bit sequence $v=[v_0, v_1, v_2, \ldots, v_{N-1}]$ as input; wherein specific examples are given in FIGS. 4A, 4B, 4C, and 4D.

A Repetition Determined by a Portion of a Data Index Set Q

In some embodiments, a repetition comprises obtaining, by the first node, a portion of a data index set Q of size Nq and a rate profiling output bit sequence v of length N; and determining, by the first node, an index $Q_{mod(r,Nq)}$ for r=0, 1, 2, . . . , E−N−1; and determining, by the first node, a bit $v_{Q_{mod(r,Nq)}}$ in the rate profiling output bit sequence v into the second part bit sequence c' as $$c'_r = v_{q_{mod(r,Nq)}}, r = 0, 1, 2, \ldots, E-N-1.$$

A Repetition According to a Binary Representation of the Output Bit Sequence Length E and the Data Index Set Q In some embodiments, a repetition comprises obtaining, by the first node, a rate profiling output bit sequence v of length N and a portion of a data index set Q of size Nq; and determining, by the first node, $$b_n^{(E)}, b_{n-1}^{(E)}, \ldots, b_2^{(E)}, b_1^{(E)}, b_0^{(E)}$$

being binary representation of the output bit sequence length E, i.e., $$E = \sum_{i=0}^{n} b_i^{(E)} \cdot 2^i$$

with $N=2^n$; and determining, by the first node, n repetition index sequences $Q^{(n-1)}, Q^{(n-2)}, \ldots, Q^{(1)}, Q^{(0)}$ according to a portion of a data index set Q of length Nq and n bits $$b_{n-1}^{(E)}, \ldots, b_2^{(E)}, b_1^{(E)}, b_0^{(E)};$$

determining, by the first node, n repetition sub-sequences $c'^{(n-1)}, c'^{(n-2)}, \ldots, c'^{(1)}, c'^{(0)}$ according to the rate profiling output bit sequence v of length N and n repetition index sequence $Q^{(n-1)}, Q^{(n-2)}, \ldots, Q^{(1)}, Q^{(0)}$; and determining, by the first node, a second part bit sequence c' such that the second part bit sequence c' is a concatenation of n repetition sub-sequences $c'^{(n-1)}, c'^{(n-2)}, \ldots, c'^{(1)}, c'^{(0)}$ i.e., $c'=[c'^{(n-1)}, c'^{(n-2)}, \ldots, c'^{(1)}, c'^{(0)}]$ or $c'=[c'^{(0)}, c'^{(1)}, \ldots, c'^{(n-2)}, c'^{(n-1)}]$.

Here, N is the polar matrix size; the portion of the data index set Q comprises the first Nq elements $Q_0, Q_1, Q_2, \ldots, Q_{Nq-1}$ in the data index set Q;

for i=0, 1, . . . , n−1, the i-th repetition index sequence $Q^{(i)}$ is determined as (1) if $$b_i^{(E)} = 0,$$

determine, by the first node, the i-th repetition index sequence $Q^{(i)}$ to be an empty index sequence; and (2) if $$b_i^{(E)} = 1,$$

① determine, by the first node, the i-th repetition sub-sequence $Q^{(i)}$ to be of length $$E_i = b_i^{(E)} \cdot 2^i;$$

and

② determining, by the first node, the i-th repetition index sequence $Q^{(i)}$ based on the portion of the data index set Q of size Nq as $$Q_r^{(i)} = Q_{\mathrm{mod}(r,Nq)},\ r = 0, 1, 2, \ldots, E_i - 1;$$

for i=0, 1, . . . , n−1, the i-th repetition sub-sequence $c'^{(i)}$ is determined as (1) if the i-th repetition sub-sequence $Q^{(i)}$ is an empty index sequence, determine, by the first node, the i-th repetition sub-sequence $c'^{(i)}$ to be an empty bit sequence;

(2) if the i-th repetition sub-sequence $Q^{(i)}$ is not an empty index sequence, determine the i-th repetition sub-sequence $c'^{(i)}$ as follows.

① determining, by the first node, the length of the i-th repetition sub-sequences $c'^{(i)}$ to be the same as that of the i-th repetition index sequence $Q^{(i)}$, i.e., the length of the i-th repetition sub-sequences $$c'^{(i)} \text{ is } E_i = b_i^{(E)} \cdot 2^i;$$

② determining, by the first node, the i-th repetition sub-sequences $c'^{(i)}$ as $$c_r'^{(i)} = v_{Q_r^{(i)}},\ r = 0, 1, 2, \ldots, E_i - 1.$$

A Repetition According to a Repetition Index Sequence R With Elements in the Data Index Set Q In some embodiments, a repetition comprises obtaining, by the first node, the rate profiling output bit sequence $v=[v_0, v_1, v_2, \ldots, v_{N-1}]$; and determining, by the first node, the second part bit sequence c' according to a repetition index sequence $R=[R_0, R_1, \ldots, R_{Nr-2}, R_{Nr-1}]$ of length Nr as $$c'_r = v_{R_r},\ r = 0, 1, 2, \ldots, Nr.$$

Here, Nr=E−N is the repetition index sequence length; for r=0, 1, 2, . . . , Nr−1, $R_r$ is an element belonging to a data index set $Q=\{Q_0, Q_1, \ldots, Q_{K-1}\}$; wherein, K is the input bit sequence length; N is the polar matrix size; E is the output bit sequence length.

A first specific example with parameters as an input bit sequence length K=4, a polar matrix size N=8, an output bit sequence length E=11, a repetition index sequence length Nr=E−N=11−8=3, a rate profiling output bit sequence $v=[v_0, v_1, v_2, \ldots, v_{N-1}]=[v_0, v_1, v_2, v_3, v_4, v_5, v_6, v_7]$, a data index set $Q=\{Q_0, Q_1, \ldots, Q_{K-1}\}=\{Q_0, Q_1, Q_2, Q_3\}=\{3, 5, 6, 7\}$, and a repetition index sequence $R=[R_0, R_1, \ldots, R_{Nr-2}, R_{Nr-1}]=[R_0, R_1, R_2]=[Q_3, Q_0, Q_1]=[6, 3, 5]$, then, a second part bit sequence $c'=[c'_0, c'_1, \ldots, c'_{N-E-1}]=[c'_0, c'_1, c'_2]=[v_{Q_3}, v_{Q_0}, v_{Q_1}]=[v_7, v_3, v_5]$.

A second specific example with parameters as an input bit sequence length K=4, a polar matrix size N=8, an output bit sequence length E=11, a repetition index sequence length Nr=E−N=11−8=3, a rate profiling output bit sequence $v=[v_0, v_1, v_2, \ldots, v_{N-1}]=[v_0, v_1, v_2, v_3, v_4, v_5, v_6, v_7]$, a data index set $Q=\{Q_0, Q_1, \ldots, Q_{K-1}\}=\{Q_0, Q_1, Q_2, Q_3\}=\{3, 5, 6, 7\}$, and a repetition index sequence $R=[R_0, R_1, \ldots, R_{Nr-2}, R_{Nr-1}]=[R_0, R_1, R_2]=[Q_0, Q_0, Q_1]=[3, 3, 5]$, then, a second part bit sequence $c'=[c'_0, c'_1, \ldots, c'_{N-E-1}]=[c'_0, c'_1, c'_2]=[v_{Q_0}, v_{Q_0}, v_{Q_1}]=[v_3, v_3, v_5]$.

A third specific example with an input bit sequence length K=4, a polar matrix size N=8, an output bit sequence length E=14, a repetition index sequence length Nr=E−N=14−8=6, a rate profiling output bit sequence $v=[v_0, v_1, v_2, \ldots, v_{N-1}]=[v_0, v_1, v_2, v_3, v_4, v_5, v_6, v_7]$, a data index set $Q=\{Q_0, Q_1, \ldots, Q_{K-1}\}=\{Q_0, Q_1, Q_2, Q_3\}=\{3, 5, 6, 7\}$, and a repetition index sequence $R=[R_0, R_1, \ldots, R_{Nr-2}, R_{Nr-1}]=[R_0, R_1, R_2, R_3, R_4, R_5]=[Q_0, Q_0, Q_1, Q_2, Q_2, Q_2]=[3, 3, 5, 6, 6, 6]$, a second part bit sequence $c'=[c'_0, c'_1, \ldots, c'_{N-E-1}]=[c'_0, c'_1, c'_2, c'_3, c'_4, c'_5]=[v_{Q_0}, v_{Q_0}, v_{Q_1}, v_{Q_2}, v_{Q_2}, v_{Q_2}]=[v_3, v_3, v_5, v_6, v_6, v_6]$.

A Repetition According to a Repetition Index Sequence R With Elements in the Data Index Set Q and a Repetition Number Sequence T In some embodiments, a repetition comprises obtaining, by the first node, the rate profiling output bit sequence $v=[v_0, v_1, v_2, \ldots, v_{N-1}]$; and determining, by the first node, the second part bit sequence c' according to a repetition index sequence $R=[R_0, R_1, \ldots, R_{Nr-2}, R_{Nr-1}]$ of length Nr and a repetition number sequence $T=[T_0, T_1, \ldots, T_{Nr-2}, T_{Nr-1}]$ of length Nr such that for r=0, 1, 2, . . . , Nr, the second part bit sequence c' comprises $T_r$ copies of the $R_r$-th bit $c_{R_r}$ in the portion of the input bit sequence c.

A specific example for a repetition of a second part bit sequence c' corresponding to a portion of the input bit sequence c, a repetition index sequence $R=[R_0, R_1, \ldots, R_{Nr-2}, R_{Nr-1}]$ and a repetition number sequence $T=[T_0, T_1, \ldots, T_{Nr-2}, T_{Nr-1}]$ is as follows $$[c'_0, c'_1, \ldots, c'_{E-N-1}] = \Big[\underbrace{v_{R_0}, \ldots, v_{R_0}}_{T_0\ copies},$$

-continued $$\underbrace{v_{R_1}, \ldots, v_{R_1}}_{T_1 \text{ copies}}, \ldots, \underbrace{v_{R_{Nr-2}}, \ldots, v_{R_{Nr-2}}}_{T_{Nr-2} \text{ copies}}, \underbrace{v_{R_{Nr-1}}, \ldots, v_{R_{Nr-1}}}_{T_{Nr-1} \text{ copies}} \Bigg].$$

Here, Nr is a positive integer not greater than the input bit sequence length K; for r=0, 1, 2, . . . , Nr−1, $R_r$ is an element belonging to a data index set $Q=\{Q_0, Q_1, \ldots, Q_{K-1}\}$; for any two indices r0≠r1 but $R_{r0} \neq R_{r1}$; for r=0, 1, 2, . . . , Nr, the element $T_r$ in the repetition number sequence $T=[T_0, T_1, \ldots, T_{Nr-2}, T_{Nr-1}]$ is a positive integer; the summation of elements in the repetition number sequence $T=[T_0, T_1, \ldots, T_{Nr-2}, T_{Nr-1}]$ is equal to E−N, i.e., $$\sum_{r=0}^{Nr-1} T_r = E - N;$$

wherein K is the input bit sequence length, N is the polar matrix size, and, E is the output bit sequence length.

A first specific examples with parameters as K=4, N=8, E=14, a rate profiling output bit sequence $v=[v_0, v_1, v_2, \ldots, v_{N-1}]=[v_0, v_1, v_2, v_3, v_4, v_5, v_6, v_7]$, a data index set $Q=\{Q_0, Q_1, \ldots, Q_{K-1}\}=\{Q_0, Q_1, Q_2, Q_3\}=\{3, 5, 6, 7\}$, a repetition index sequence $R=[R_0, R_1, R_2]=[Q_2, Q_3, Q_1]=[6, 7, 5]$ of length Nr=3, and a repetition number sequence $T=[T_0, T_1, \ldots, T_{Nr-1}]=[2, 1, 3]$ of size Nr=3 with $T_0+T_1+T_2=2+1+3=6=E-N=14-8$, then, a second part bit sequence $c'=[c'_0, c'_1, \ldots, c'_{E-N-1}]=[c'_0, c'_1, c'_2, c'_3, c'_4, c'_5]=[v_{Q_2}, v_{Q_2}, v_{Q_3}, v_{Q_1}, v_{Q_1}, v_{Q_1}]=[v_6, v_6, v_7, v_5, v_5, v_5]$ corresponding to a portion of the rate profiling output bit sequence $v=[v_0, v_1, v_2, \ldots, v_{N-1}]=[v_0, v_1, v_2, v_3, v_4, v_5, v_6, v_7]$.

A second specific examples with parameters K=4, N=8, E=13, a rate profiling output bit sequence $v=[v_0, v_1, v_2, \ldots, v_{N-1}]=[v_0, v_1, v_2, v_3, v_4, v_5, v_6, v_7]$, a data index set $Q=\{Q_0, Q_1, \ldots, Q_{K-1}\}=\{Q_0, Q_1, Q_2, Q_3\}=\{3, 5, 6, 7\}$, a repetition index sequence $R=[R_0, R_1, R_2]=[Q_2, Q_3, Q_1]=[6, 7, 5]$ of length Nr=3, and a repetition number sequence $T=[T_0, T_1, \ldots, T_{Nr-1}]=[2, 1, 2]$ of size Nr=3 with $T_0+T_1+T_2=2+1+2=5=E-N=13-8$, a second part bit sequence $c'=[c'_0, c'_1, \ldots, c'_{E-N-1}]=[c'_0, c'_1, c'_2, c'_3, c'_4]=[v_{Q_2}, v_{Q_2}, v_{Q_3}, v_{Q_1}, v_{Q_1}]=[v_6, v_6, v_7, c_5, c_5]$ corresponding to a portion of the rate profiling output bit sequence $v=[v_0, v_1, \ldots, v_{N-1}]=[v_0, v_1, v_2, v_3, v_4, v_5, v_6, v_7]$.

Embodiment 14

This section introduces examples involving a second interleaving operation after a concatenation operation.

Embodiment 14 is based on the above related embodiments.

In some embodiments, the output sequence $e=[e_0, e_1, \ldots, e_{E-1}]$ is further interleaved into a second output bit sequence $f=[f_0, f_1, \ldots, f_{E-1}]$, wherein E is the length of the output sequence e; the second output bit sequence $f=[f_0, f_1, \ldots, f_{E-1}]$ is a permutation of the output sequence $e=[e_0, e_1, \ldots, e_{E-1}]$.

Embodiment 15

This section discloses examples involving modulation after rate matching or second interleaving.

Embodiment 15 is based on the above embodiments.

In some embodiments, the output sequence $e=[e_0, e_1, \ldots, e_{E-1}]$ is further modulated into a first output symbol sequence $x=[x_0, x_1, \ldots, x_{E/Qm-1}]$ using one of the following modulation:

π/2 binary phase shift keying (π/2-BPSK),
binary phase shift keying (BPSK),
quadrature phase shift keying (QPSK),
quadrature amplitude modulation (QAM),
phase shift keying (PSK),
amplitude shift keying (ASK),
amplitude phase shift keying (APSK).

Here $Q_m$ is the modulation order.

In some embodiments, the second output bit sequence $f=[f_0, f_1, \ldots, f_{E-1}]$ is further modulated into a first output symbol sequence $x=[x_0, x_1, \ldots, x_{E/Qm-1}]$ using one of the following modulation:

π/2 binary phase shift keying (π/2-BPSK),
binary phase shift keying (BPSK),
quadrature phase shift keying (QPSK),
quadrature amplitude modulation (QAM),
phase shift keying (PSK),
amplitude shift keying (ASK),
amplitude phase shift keying (APSK).

Here, $Q_m$ is the modulation order.

Embodiment 16

This section discloses examples involving input sequence c comprising CRC bits.

Embodiment 16 is based on the above embodiments.

In some embodiments, the input sequence c comprises Lcrc cyclic redundancy check (CRC) bits determined by a cyclic generator polynomial $g'(D)=g'_{Lcrc} \cdot D^{Lcrc}+g'_{Lcrc-1} \cdot D^{Lcrc-1}+ \ldots +g'_2 \cdot D^2+g'_1 \cdot D+g'_0$ with coefficients over GF(2) and K-Lcrc payload bits.

In some embodiments, the input sequence c is determined by the first node by attaching Lcrc cyclic redundancy check (CRC) bit to a payload sequence of length K−Lcrc, wherein, the Lcrc CRC bits are determined by a cyclic generator polynomial $g'(D)=g'_{Lcrc} \cdot D^{Lcrc}+g'_{Lcrc-1} \cdot D^{Lcrc-1}+ \ldots +g'_2 \cdot D^2+g'_1 \cdot D+g'_0$ with coefficients over GF(2).

Examples Based on the Disclosed Embodiments

Example 1: In Example 1, a first part bit sequence of the output bit sequence e of length E is an interleaving output bit sequence d' of length N. In Example 1, a first node obtains an input bit sequence $c=[c_0, c_1, c_2, c_3, c_4, c_5, c_6, c_7, c_8, c_9, \ldots, c_{165}, c_{166}, c_{167}, c_{168}, c_{169}, c_{170}, c_{171}, c_{172}, c_{173}, c_{174}, c_{175}, c_{176}, c_{177}, c_{178}]$ of length K=179, wherein, the input sequence c comprises Lcrc=19 cyclic redundancy check (CRC) bits and K−Lcrc=179−19=160 payload bits, wherein the CRC bits are determined by a cyclic generator polynomial $g'(D)=g'_{Lcrc} \cdot D^{Lcrc}+g'_{Lcrc-1} \cdot D^{Lcrc-1}+ \ldots +g'_2 \cdot D^2+g'_1 \cdot D+g'_0=D^{19}+D^{18}+D^{15}+D^9+D^8+D^5+D^4+D^3+D^2+1$.

Figure 4A:
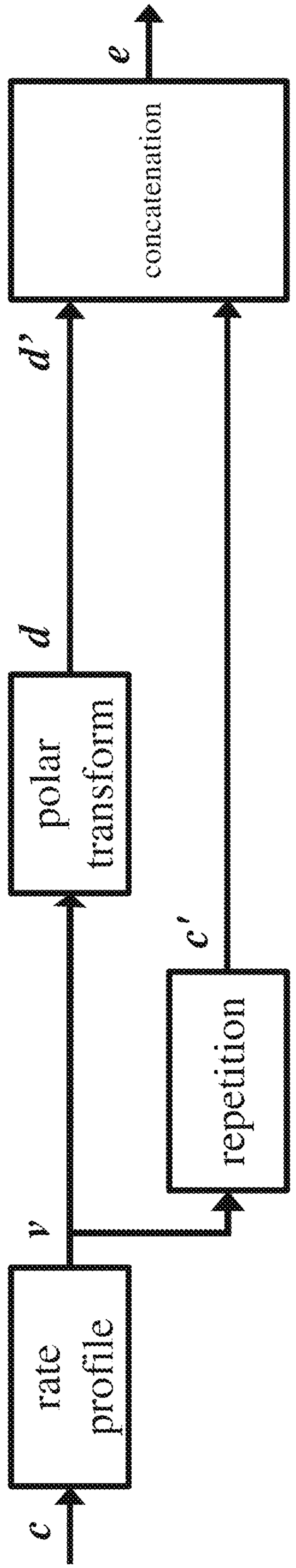
FIG. 4A shows a first rate matching example for polar codes without both a pre-transform and an interleaving.
Figure 4B:
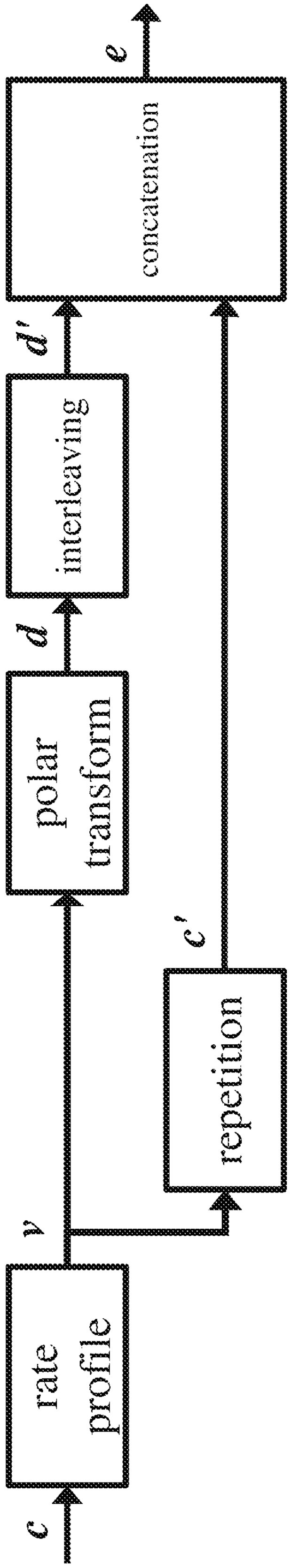
FIG. 4B shows a second rate matching example for polar codes with an interleaving.
Figure 4C:
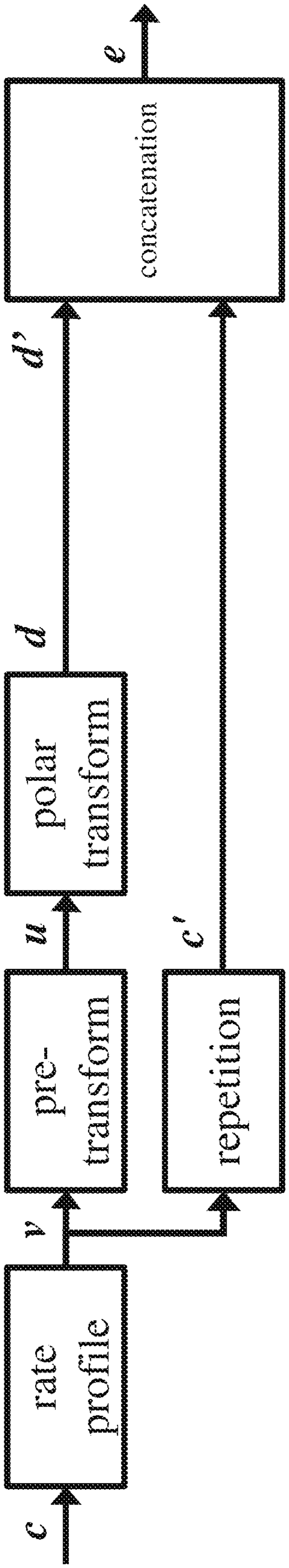
FIG. 4C shows a third rate matching example for polar codes with a pre-transform.
Figure 4D:
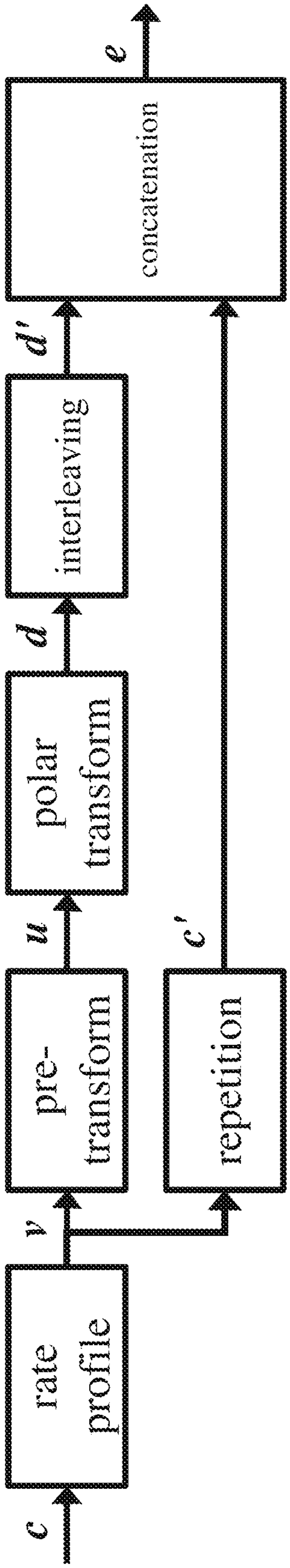
FIG. 4D shows a fourth rate matching example for polar codes with both a pre-transform and an interleaving.
Figure 4E:
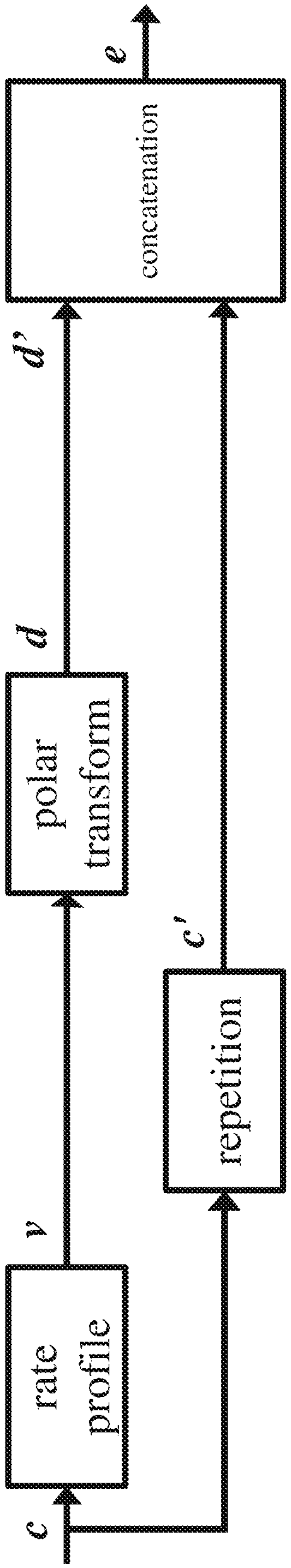
FIG. 4E shows a fifth rate matching example for polar codes without both a pre-transform and an interleaving.
Figure 4F:
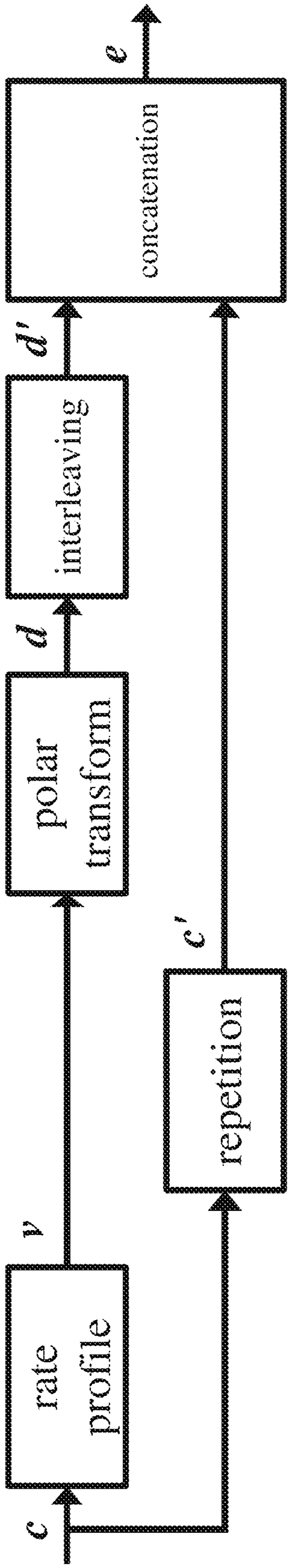
FIG. 4F shows a sixth rate matching example for polar codes with an interleaving.
Figure 4G:
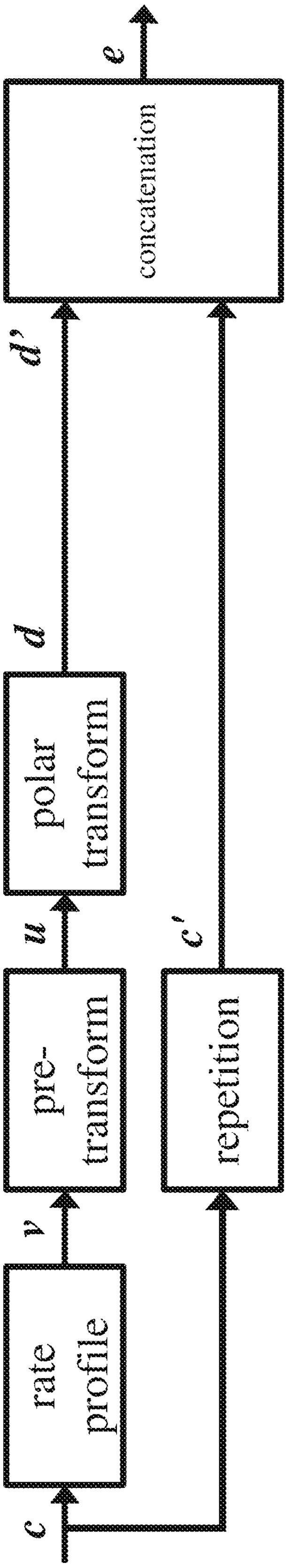
FIG. 4G shows a seventh rate matching example for polar codes with a pre-transform.
Figure 4H:
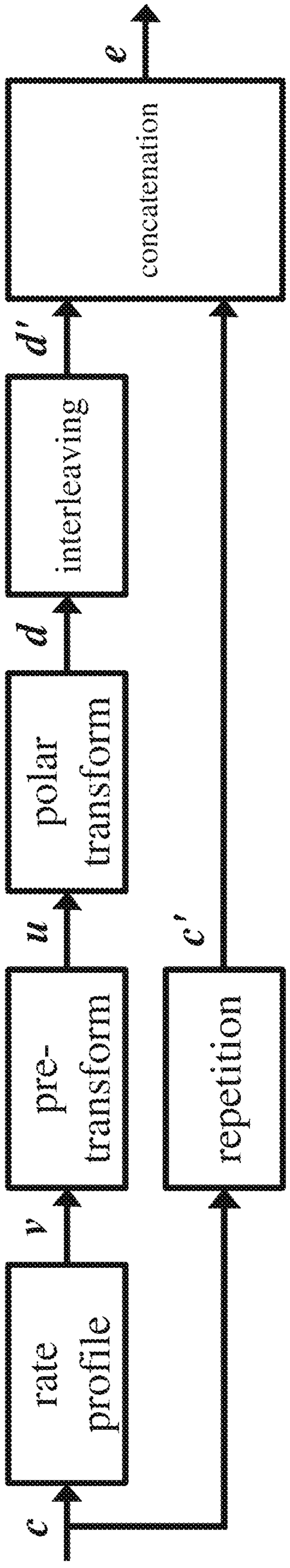
FIG. 4H shows an eighth rate matching example for polar codes with both a pre-transform and an interleaving.

As in FIG. 4B, the first node performs the following to determine an output bit sequence $e=[e_0, e_1, e_2, e_3, e_4, e_5, e_6, e_7, e_8, e_9, e_{10}, e_{11}, e_{12}, e_{13}, e_{14}, e_{15}, \ldots, e_{253}, e_{254}, e_{255}, e_{256}, e_{257}, e_{258}, e_{259}, e_{260}, e_{261}, e_{262}, e_{263}]$ of length E=264 according to a polar transform matrix $G^{(256)}$ of size N=256:

(1) Perform a rate profile on an input bit sequence $c=[c_0, c_1, c_2, c_3, c_4, c_5, c_6, c_7, C_8, C_9, \ldots, c_{165}, c_{166}, c_{167}, c_{168}, c_{169}, c_{170}]$ of length K=179 according to a data bit index set $Q=\{Q_0, Q_1, Q_2, \ldots, Q_{177}, Q_{178}\}=\{29, 43, 98, 88, 140, 30, 146, 71, 161, 45, 100, 51, 148, 46, 75, 104, 162, 53, 193, 152, 77, 164, 54, 83, 57, 112, 135, 78, 194, 85, 58, 168, 139, 99, 86, 60, 89, 196, 141, 101, 147, 176, 142, 31, 200, 90, 149, 102, 105, 163, 92, 47, 208, 150, 153, 165, 106, 55, 113, 154, 79, 108, 224, 166, 195, 59, 169, 114, 156, 87, 197, 116, 170, 61, 177, 91, 198, 172, 120, 201, 62, 143, 103, 178, 93, 202, 107, 180, 151, 209, 94, 204, 155, 210, 109, 184, 115, 167, 225, 157, 110, 117, 212, 171, 226, 216, 158, 118, 173, 121, 199, 179, 228, 174, 122, 203, 63, 181, 232, 124, 205, 182, 211, 185, 240, 206, 95, 213, 186, 227, 111, 214, 188, 217, 229, 159, 119, 218, 230, 233, 175, 123, 220, 183, 234, 125, 241, 207, 187, 236, 126, 242, 244, 189, 215, 219, 231, 248, 190, 221, 235, 222, 237, 243, 238, 245, 127, 191, 246, 249, 250, 252, 223, 239, 251, 247, 253, 254, 255} with K=179 elements resulting in a rate profile output bit sequence $v=[v_0, v_1, v_2, v_3, v_4, v_5, v_6, v_7, \ldots, v_{253}, v_{254}, v_{255}]$ of length N=255 as

```
k = 0;
For i = 0 to N − 1
  If i ∈ Q
    v_i = c_k;
    k = k + 1;
  Else
    v_i = 0;
  End if
End for
```

wherein, the data bit index set Q is sorted in ascending order according to polarized sub-channel reliabilities with $W(Q_0)<W(Q_1)<W(Q_2)< \ldots <W(Q_{177})<W(Q_{178})$.

(2) Perform a polar transform with the rate profile output bit sequence $v=[v_0, v_1, v_2, v_3, v_4, v_5, v_6, v_7, \ldots, v_{253}, v_{254}, v_{255}]$ as a polar transform input bit sequence using a polar matrix $G^{(256)}=(P^{(2)})^{\otimes 8}$ of size N=256 to obtain a polar transform output bit sequence $d=[d_0, d_1, d_2, d_3, d_4, d_5, d_6, d_7, \ldots, d_{253}, d_{254}, d_{255}]$ of length N=256 as $d=u \cdot G^{(256)}$, wherein, the matrix operation is over GF(2), $$P^{(2)} = \begin{bmatrix} 1 & 0 \\ 1 & 1 \end{bmatrix}, (P^{(2)})^{\otimes 8}$$

is the 8-th Kronecker power of the matrix $P^{(2)}$.

(3) Perform an interleaving on the polar transform output bit sequence $d=[d_0, d_1, \ldots, d_{N-1}]=[d_0, d_1, d_2, d_3, d_4, d_5, d_6, d_7, \ldots, d_{253}, d_{254}, d_{255}]$ of length N=256 and determine an interleaving output bit sequence $d'=[d'_0, d'_1, \ldots, d'_{N-1}]=[d'_0, d'_1, d'_2, d'_3, d'_4, d'_5, d'_6, d'_7, \ldots, d'_{253}, d'_{254}, d'_{255}]$ is of length N=256 as follows $$d'_i=d_{J_i}$$

for i=0, 1, 2, 3, 4, 5, 6, 7, . . . , 253, 254, 255, the i-th bits of the interleaving output bit sequence d' is equal to the $J_i$-th bit of the interleaving input bit sequence d, wherein, $J=[J_0, J_1, \ldots, J_{N-2}, J_{N-1}]=[J_0, J_1, J_2, J_3, J_4, J_5, J_6, J_7, \ldots, J_{253}, J_{254}, J_{255}]$=[0, 1, 2, 3, 4, 5, 6, 7, 8, 9, 10, 11, 12, 13, 14, 15, 16, 17, 18, 19, 20, 21, 22, 23, 32, 33, 34, 35, 36, 37, 38, 39, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 128, 129, 130, 131, 132, 133, 134, 135, 72, 73, 74, 75, 76, 77, 78, 79, 136, 137, 138, 139, 140, 141, 142, 143, 80, 81, 82, 83, 84, 85, 86, 87, 144, 145, 146, 147, 148, 149, 150, 151, 88, 89, 90, 91, 92, 93, 94, 95, 152, 153, 154, 155, 156, 157, 158, 159, 96, 97, 98, 99, 100, 101, 102, 103, 160, 161, 162, 163, 164, 165, 166, 167, 104, 105, 106, 107, 108, 109, 110, 111, 168, 169, 170, 171, 172, 173, 174, 175, 112, 113, 114, 115, 116, 117, 118, 119, 176, 177, 178, 179, 180, 181, 182, 183, 120, 121, 122, 123, 124, 125, 126, 127, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 224, 225, 226, 227, 228, 229, 230, 231, 216, 217, 218, 219, 220, 221, 222, 223, 232, 233, 234, 235, 236, 237, 238, 239, 240, 241, 242, 243, 244, 245, 246, 247, 248, 249, 250, 251, 252, 253, 254, 255] is an interleaver pattern determined according to a sub-block interleaver pattern $\pi=[\pi_0, \pi_1, \pi_2, \pi_3, \pi_4, \pi_5, \pi_6, \pi_7, \pi_8, \pi_9, \pi_{10}, \pi_{11}, \pi_{12}, \pi_{13}, \pi_{14}, \pi_{15}, \pi_{16}, \pi_{17}, \pi_{18}, \pi_{19}, \pi_{20}, \pi_{21}, \pi_{22}, \pi_{23}, \pi_{24}, \pi_{25}, \pi_{26}, \pi_{27}, \pi_{28}, \pi_{29}, \pi_{30}, \pi_{31}]$=[0, 1, 2, 4, 3, 5, 6, 7, 8, 16, 9, 17, 10, 18, 11, 19, 12, 20, 13, 21, 14, 22, 15, 23, 24, 25, 26, 28, 27, 29, 30, 31] as

```
For i = 0 to N-1
  j = floor(32i/N);
  J_i = π_j×(N/32) + mod(i, N/32);
End for
```

(4) Set the first part bit sequence of the output bit sequence $e=[e_0, e_1, \ldots, e_{263}]$ to be the interleaving output bit sequence $d'=[d'_0, d'_1, d'_2, \ldots, d'_{255}]$ of length N=256.

(5) Perform a repetition on the rate profile output bit sequence $v=[v_0, v_1, v_2, v_3, v_4, v_5, v_6, v_7, \ldots, v_{253}, v_{254}, v_{255}]$ to obtain a second part bit sequence $c'=[c'_0, c'_1, c'_2, \ldots, c'_{E-N-1}]=[c'_0, c'_1, c'_2, c'_3, c'_4, c'_5, c'_6, c'_7]$ of length E−N=264−256=8 as obtaining, by the first node, the data index set Q of length K=179; and determining, an index $Q_{mod(r,K)}$ for r=0, 1, 2, . . . , E−N−1; and determining, by the first node, a bit $v_{Q_{mod(r,K)}}$ in the rate profiling output bit sequence v to be the r-th bit of the second part bit sequence c' as $c'_r=v_{Q_{mod(r,K)}}$, r=0, 1, 2, . . . , E−N−1. Finally, the second part bit sequence $c'=[c'_0, c'_1, c'_2, \ldots, c'_{E-N-1}]=[c'_0, c'_1, c'_2, c'_3, c'_4, c'_5, c'_6, c'_7]=[v_{Q_{mod(0,179)}}, v_{Q_{mod(1,179)}}, v_{Q_{mod(2,179)}}, v_{Q_{mod(3,179)}}, v_{Q_{mod(4,179)}}, v_{Q_{mod(5,179)}}, v_{Q_{mod(6,179)}}, v_{Q_{mod(7,179)}}]=[v_{Q_0}, v_{Q_1}, v_{Q_2}, v_{Q_3}, v_{Q_4}, v_{Q_5}, v_{Q_6}, v_{Q_7}]=[v_{29}, v_{43}, V_{98}, v_{88}, v_{140}, v_{30}, v_{146}, v_{71}]$.

(6) Perform a concatenation of the interleaving output bit sequence $d'=[d'_0, d'_1, d'_2, \ldots, d'_{255}]$ of length N=256 and the second part bit sequence $c'=[c'_0, c'_1, c'_2, c'_3, c'_4, c'_5, c'_6, c'_7]=[v_{29}, v_{43}, V_{98}, v_{88}, v_{140}, v_{30}, v_{146}, v_{71}]$ of length E−N=264−256=8 to obtain the output bit sequence $e=[e_0, e_1, e_2, \ldots, e_{255}, e_{256}, e_{257}, e_{258}, e_{259}, e_{260}, e_{261}, e_{262}, e_{263}]$ as $e=[e_0, e_1, e_2, \ldots, e_{255}, e_{256}, e_{257}, e_{258}, e_{259}, e_{260}, e_{261}, e_{262}, e_{263}]=[d', c']=[d'_0, d'_1, d'_2, \ldots, d'_{255}, c'_0, c'_1, c'_2, c'_3, c'_4, c'_5, c'_6, c'_7]=[d'_0, d'_1, d'_2, \ldots, d'_{255}, v_{29}, v_{43}, V_{98}, v_{88}, v_{140}, v_{30}, v_{146}, v_{71}]$.

Figure 7:
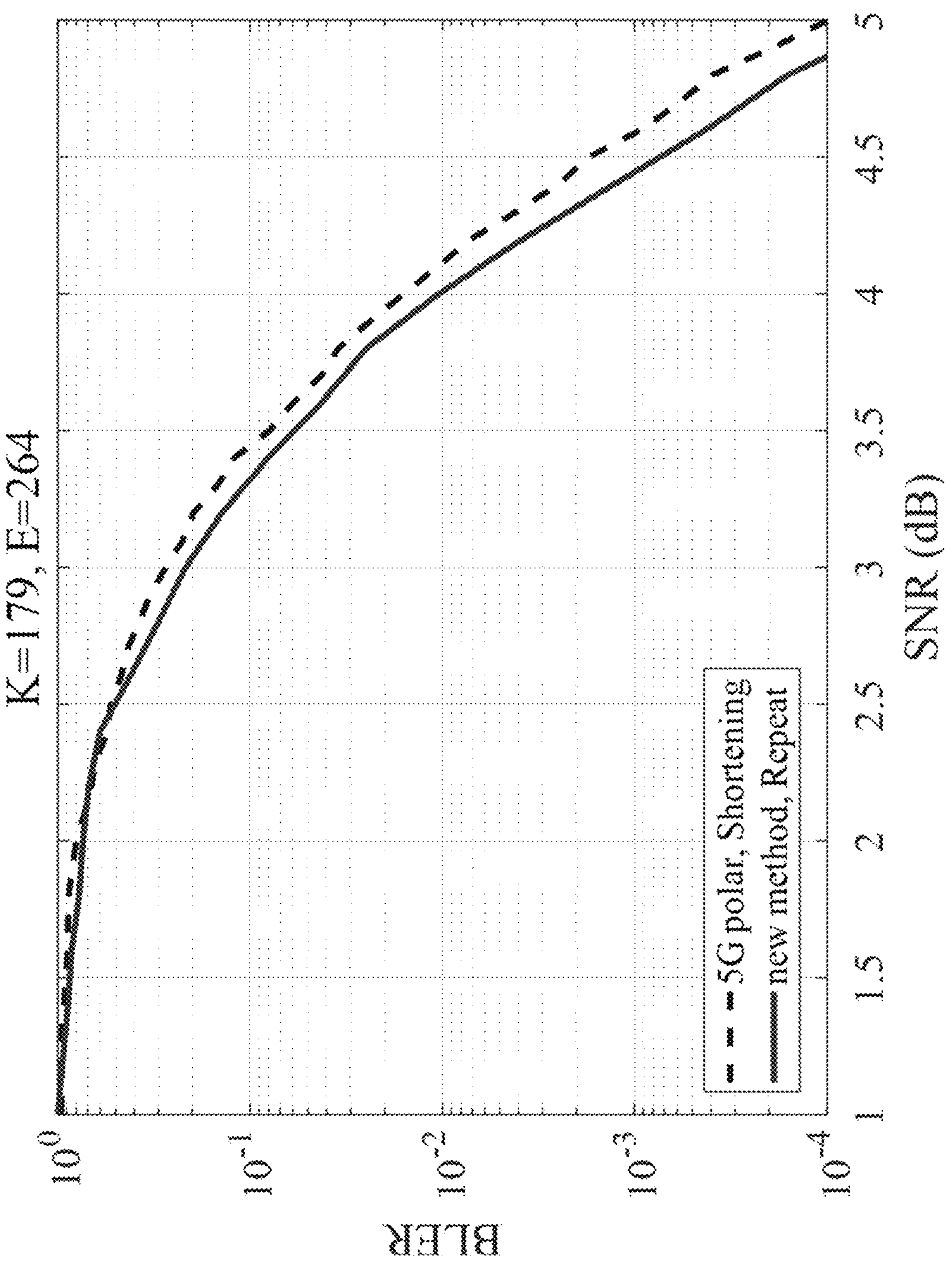
FIG. 7 shows block error rate of Example 1 over AWGN channels.

The first node transmits a signal including the output bit sequence e to a second node. FIG. 7 shows the block error rate of Example 1 over an AWGN channel, wherein the solid line is for the method in Example 1 and the dashed line is for the 5G polar coding scheme. From FIG. 7, we can see that the new method achieves a coding gain of more than 0.1 dB over than 5G polar coding scheme at the block error rate of 0.001.

Example 2: The only difference of Example 2 to Example 1 is that STEP (5) is performed as performing a repetition on the rate profile output bit sequence $v=[v_0, v_1, v_2, v_3, v_4, v_5, v_6, v_7, \ldots, v_{253}, v_{254}, v_{255}]$ to obtain a second part bit sequence $c'=[c'_0, c'_1, c'_2, \ldots, c'_{E-N-1}]=[c'_0, c'_1, c'_2, c'_3, c'_4, c'_5, c'_6, c'_7]$ of length E−N=264−256=8 as obtaining, by the first node, a portion of the data index set Q of length Nq=9, i.e., $\{Q_0, Q_1, Q_2, Q_3, Q_4, Q_5, Q_6, Q_7, Q_8\}$; and determining, by the first node, an index $Q_{mod(r,Nq)}$ for r=0, 1, 2, . . . , E−N−1; and determining, by the first node, a bit $v_{Q_{mod(r,Nq)}}$ in the rate profiling output bit sequence v into the second part bit sequence c' as $$c'_r = v_{Q_{mod(r,Nq)}},\ r = 0, 1, 2, \ldots, E-N-1.$$

Finally, the second part bit sequence $c'=[c'_0, c'_1, c'_2, \ldots, c'_{E-N-1}]=[c'_0, c'_1, c'_2, c'_3, c'_4, c'_5, c'_6, c'_7]=[v_{Q_{mod(0,9)}}, v_{Q_{mod(1,9)}}, v_{Q_{mod(2,9)}}, v_{Q_{mod(3,9)}}, v_{Q_{mod(4,9)}}, v_{Q_{mod(5,9)}}, v_{Q_{mod(6,9)}}, v_{Q_{mod(7,9)}}]=[v_{Q_0}, v_{Q_1}, v_{Q_2}, v_{Q_3}, v_{Q_4}, v_{Q_5}, v_{Q_6}, v_{Q_7}]=[v_{29}, v_{43}, v_{98}, v_{88}, v_{140}, v_{30}, v_{146}, v_{71}]$.

Example 3: The only difference of Example 3 to Example 1 is that STEP (5) is performed as Performing a repetition on the rate profile output bit sequence $v=[v_0, v_1, v_2, v_3, v_4, v_5, v_6, v_7, \ldots, v_{253}, v_{254}, v_{255}]$ to obtain a second part bit sequence $c'=[c'_0, c'_1, c'_2, \ldots, c'_{E-N-1}]=[c'_0, c'_1, c'_2, c'_3, c'_4, c'_5, c'_6, c'_7]$ of length E−N=264−256=8 as obtaining, by the first node, the rate profiling output bit sequence $v=[v_0, v_1, v_2, v_3, v_4, v_5, v_6, v_7, \ldots, v_{253}, v_{254}, v_{255}]$ of length N=256; and obtaining, by the first node, the data index set Q of length K=179, i.e., $Q=\{Q_0, Q_1, Q_2, Q_3, \ldots, Q_{177}, Q_{178}\}$; and determining, by the first node, n+1=8+1=8 bits $$[b_8^{(264)}, b_7^{(264)}, b_6^{(264)}, b_5^{(264)}, b_4^{(264)}, b_3^{(264)}, b_2^{(264)}, b_1^{(264)}, b_0^{(264)}] = [1, 0, 0, 0, 0, 1, 0, 0, 0]$$

being binary representation of the output bit sequence length E=264, i.e., $$E = \sum_{i=0}^{8} b_i^{(264)} \cdot 2^i$$

with $N=2^8$; and determining, by the first node, n=8 repetition index sequences $Q^{(7)}, Q^{(6)}, Q^{(5)}, Q^{(4)}, Q^{(3)}, Q^{(2)}, Q^{(1)}, Q^{(0)}$ according to the data index set Q of size K=179 and n=8 bits $$[b_7^{(264)}, b_6^{(264)}, b_5^{(264)}, b_4^{(264)}, b_3^{(264)}, b_2^{(264)}, b_1^{(264)}, b_0^{(264)}] = [0, 0, 0, 0, 1, 0, 0, 0]$$

as (i) since $$\text{(i) since } b_7^{(264)} = b_6^{(264)} = b_5^{(264)} = b_4^{(264)} = b_2^{(264)} = b_1^{(264)} = b_0^{(264)} = 0,$$

determine, by the first node, the repetition index sequences $Q^{(7)}, Q^{(6)}, Q^{(5)}, Q^{(4)}, Q^{(2)}, Q^{(1)}, Q^{(0)}$ to be empty index sequences; since $b_3^{(264)}=1$, determine, by the first node, the 3rd repetition sub-sequence $Q^{(3)}$ to be of length $$E_3 = b_3^{(264)} \cdot 2^3 = 8;$$

(ii) determining, by the first node, the 3rd repetition index sequence $Q^{(3)}$ based on the data index set $$Q \text{ of length } K = 179 \text{ as } [Q_0^{(3)}, Q_1^{(3)}, Q_2^{(3)}, Q_3^{(3)}, Q_4^{(3)}, Q_5^{(3)}, Q_6^{(3)}, Q_7^{(3)}] = [Q_{mod(0,179)},$$

$Q_{mod(1,179)}, Q_{mod(2,179)}, Q_{mod(3,179)}, Q_{mod(4,179)}, Q_{mod(5,179)}, Q_{mod(6,179)}, Q_{mod(7,179)}]=[Q_0, Q_1, Q_2, Q_3, Q_4, Q_5, Q_6, Q_7]=[29, 43, 98, 88, 140, 30, 146, 71]$; and determining, by the first node, a second part bit sequence c' as follows.

(i) since the repetition index sequences $Q^{(7)}, Q^{(6)}, Q^{(5)}, Q^{(4)}, Q^{(2)}, Q^{(1)}, Q^{(0)}$ are empty, determine repetition sub-sequences $c'^{(7)}=c'^{(6)}=c'^{(5)}=c'^{(4)}=c'^{(2)}=c'^{(1)}=c'^{(0)}=[\ ]$;

(ii) since the repetition index sequences $Q^{(3)}$ is of length $E_3=8$, the length of the 3rd repetition sub-sequences $c'^{(3)}$ to be of length $E_3=8$;

(iii) determine the 3rd repetition sub-sequences $$c'^{(3)} = [c_0'^{(3)}, c_1'^{(3)}, c_2'^{(3)}, c_3'^{(3)}, c_4'^{(3)}, c_5'^{(3)}, c_6'^{(3)}, c_7'^{(3)}] = [v_{Q_0^{(3)}}, v_{Q_1^{(3)}}, v_{Q_2^{(3)}}, v_{Q_3^{(3)}}, v_{Q_4^{(3)}}, v_{Q_4^{(3)}}, v_{Q_6^{(3)}}, v_{Q_7^{(3)}}] = [v_{Q_0}, v_{Q_1}, v_{Q_2}, v_{Q_3}, v_{Q_4}, v_{Q_5}, v_{Q_6}, v_{Q_7}] = [v_{29}, v_{43}, v_{98}, v_{88}, v_{140}, v_{30}, v_{146}, v_{71}]$$

(iv) Concatenate n=8 repetition sub-sequences $c'^{(7)}, c'^{(6)}, c'^{(5)}, c'^{(4)}, c'^{(3)}, c'^{(2)}, c'^{(1)}, c'^{(0)}$ into the second part bit sequence as $c'=[c'^{(7)}, c'^{(6)}, c'^{(5)}, c'^{(4)}, c'^{(3)}, c'^{(2)}, c'^{(1)}, c'^{(0)}]=c'^{(3)}=[v_{29}, v_{43}, v_{98}, v_{88}, v_{140}, v_{30}, v_{146}, v_{71}]$.

Finally, the second part bit sequence $c'=[v_{29}, v_{43}, v_{98}, v_{88}, v_{140}, v_{30}, v_{146}, v_{71}]$.

Figure 8:
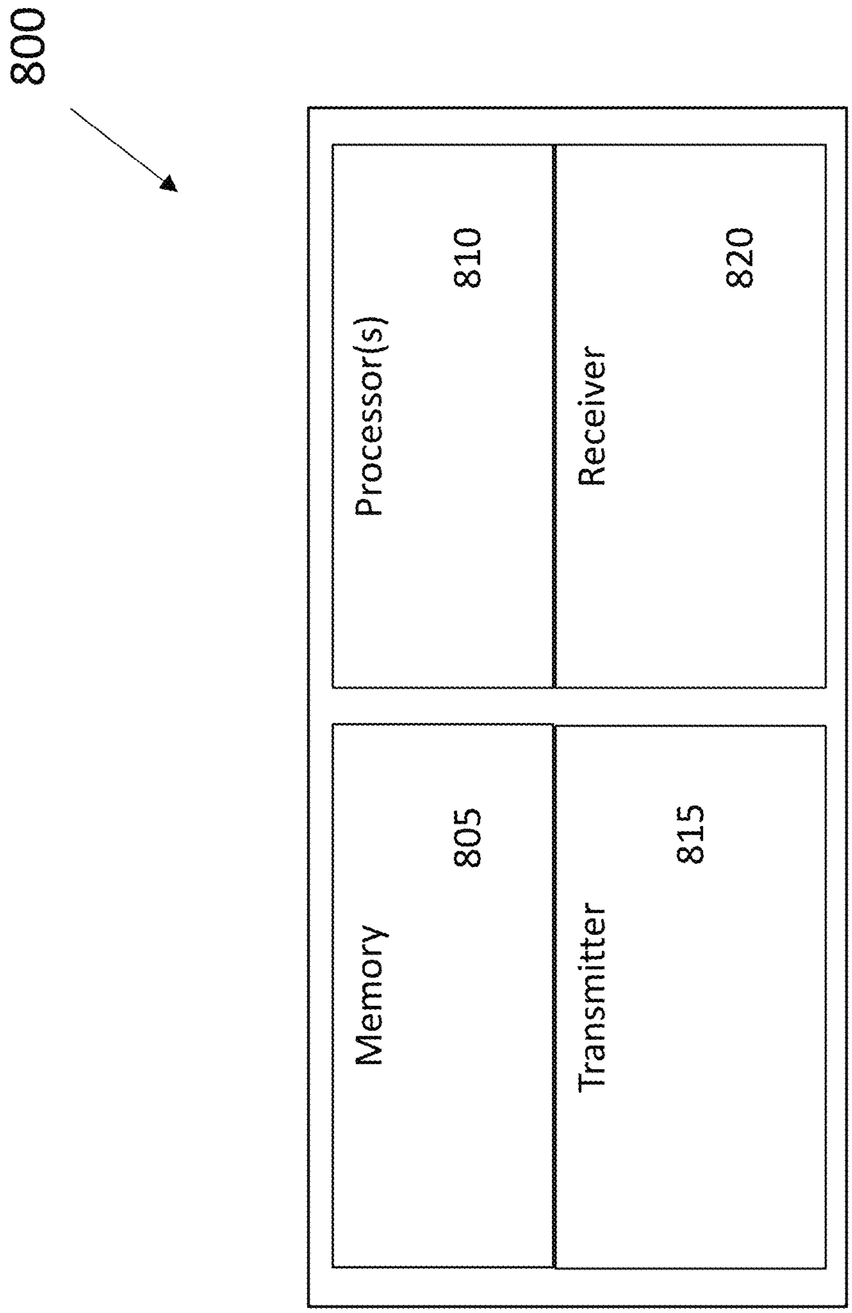
FIG. 8 shows an exemplary block diagram of a hardware platform that may be a part of a network device or a communication device.

FIG. 8 shows an exemplary block diagram of a hardware platform 800 that may be a part of a network device (e.g., base station) or a communication device (e.g., a user equipment (UE)). The hardware platform 800 includes at least one processor 810 and a memory 805 having instructions stored thereupon. The instructions upon execution by the processor 810 configure the hardware platform 800 to perform the operations described in FIGS. 1 to 7 and in the various embodiments described in this patent document. The transmitter 815 transmits or sends information or data to another device. For example, a network device transmitter can send a message to user equipment. The receiver 820 receives information or data transmitted or sent by another device. For example, user equipment can receive a message from a network device.

Figure 9:
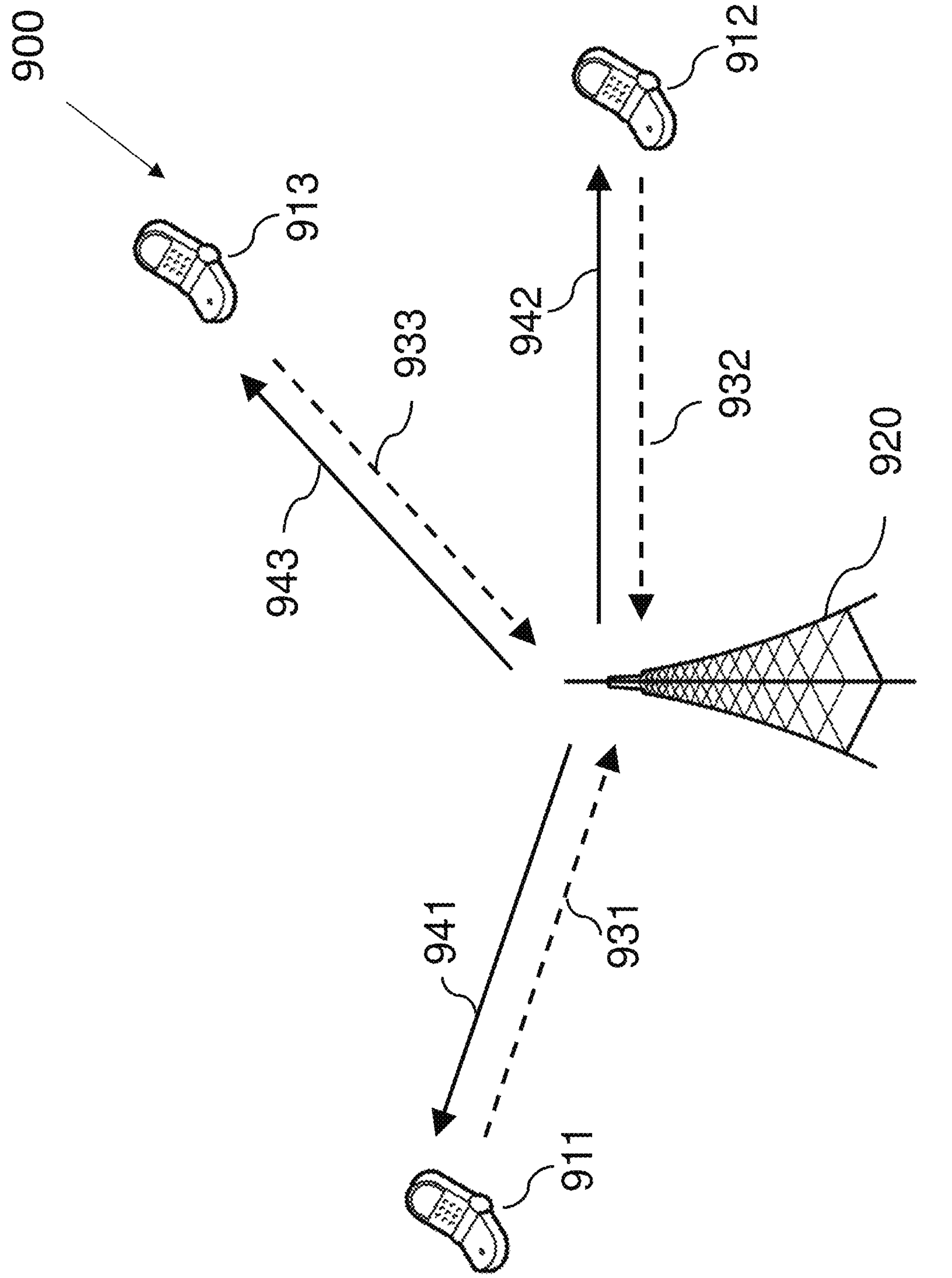
FIG. 9 shows an example of network communication including a base station (BS) and user equipment (UE) based on some implementations of the disclosed technology.

The implementations as discussed above will apply to a network communication. FIG. 9 shows an example of a communication system (e.g., a 5G or NR cellular network) that includes a base station 920 and one or more user equipment (UE) 911, 912 and 913. In some embodiments, the UEs access the BS (e.g., the network) using a communication link to the network (sometimes called uplink direction, as depicted by dashed arrows 931, 932, 933), which then enables subsequent communication (e.g., shown in the direction from the network to the UEs, sometimes called downlink direction, shown by arrows 941, 942, 943) from the BS to the UEs. In some embodiments, the BS send information to the UEs (sometimes called downlink direction, as depicted by arrows 941, 942, 943), which then enables subsequent communication (e.g., shown in the direction from the UEs to the BS, sometimes called uplink direction, shown by dashed arrows 931, 932, 933) from the UEs to the BS. The UE may be, for example, a smartphone, a tablet, a mobile computer, a machine to machine (M2M) device, an Internet of Things (IoT) device, and so on.

Figure 10:
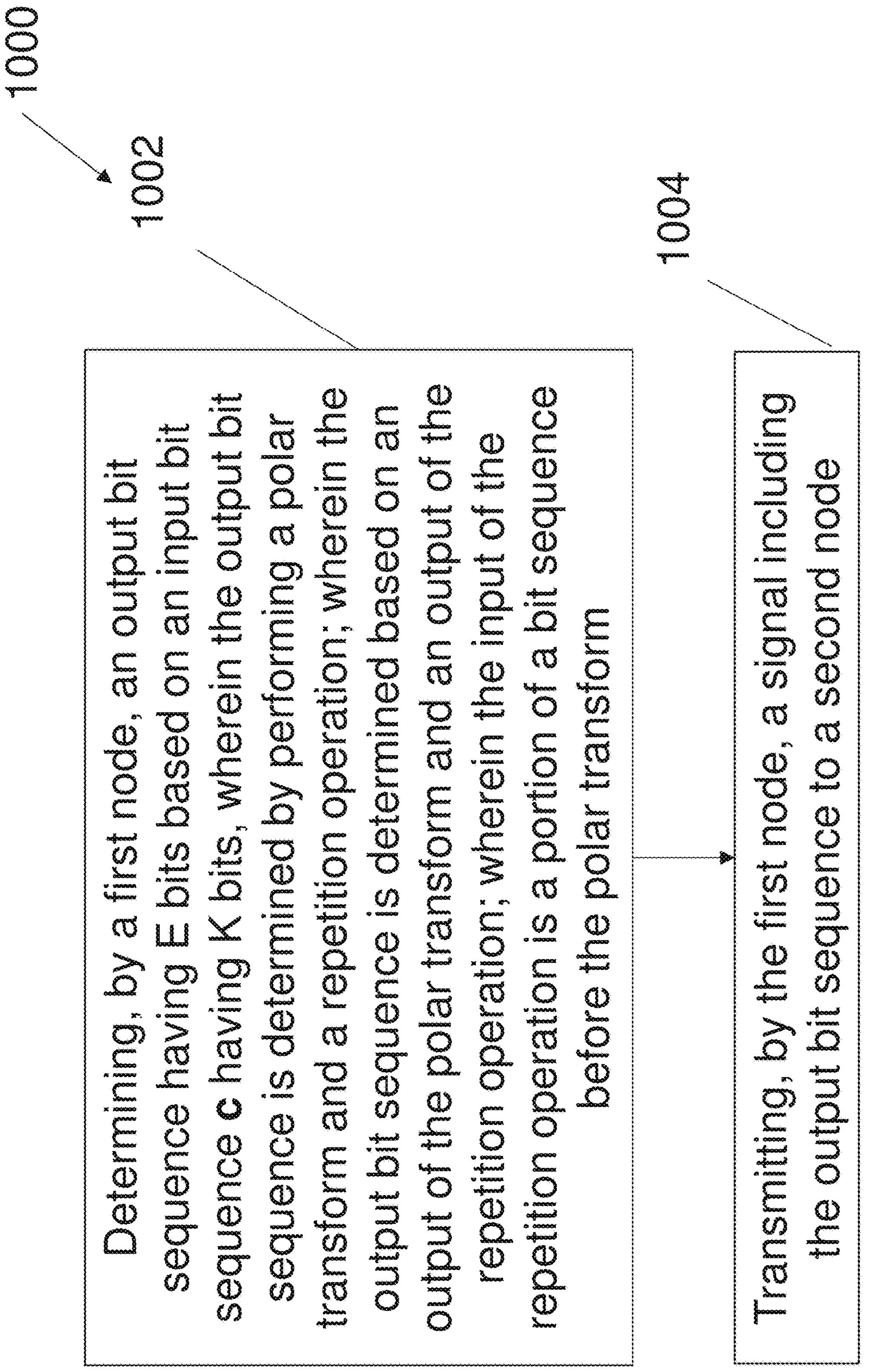
FIG. 10 is a flowchart representation of a method for digital communication in accordance with one or more embodiments of the present technology.

FIG. 10 shows an example flowchart representation of a method for digital communication in accordance with one or more embodiments of the present technology. Operation 1002 includes Determining, by a first node, an output bit sequence having E bits based on an input bit sequence c having K bits, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform. Operation 1004 includes transmitting, by the first node, a signal including the output bit sequence to a second node.

Figure 11:
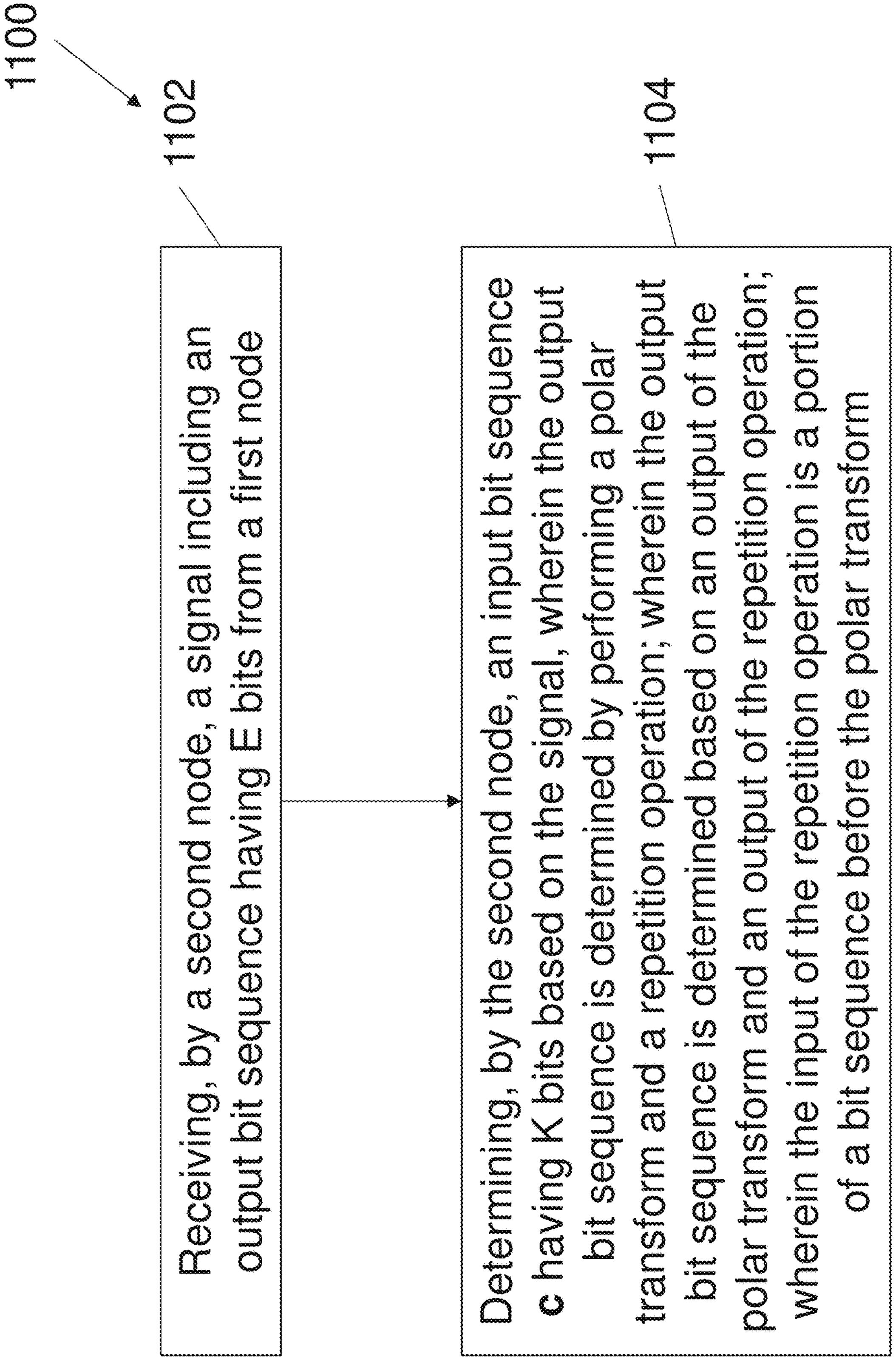
FIG. 11 is a flowchart representation of another method for digital communication in accordance with one or more embodiments of the present technology.

FIG. 11 shows another example flowchart representation of a method for digital communication in accordance with one or more embodiments of the present technology Operation 1102 includes receiving, by a second node, a signal including an output bit sequence having E bits from a first node. Operation 1104 includes determining, by the second node, an input bit sequence c having K bits based on the signal, wherein the output bit sequence is determined by performing a polar transform and a repetition operation; wherein the output bit sequence is determined based on an output of the polar transform and an output of the repetition operation; wherein the input of the repetition operation is a portion of a bit sequence before the polar transform.

Various preferred embodiments and additional features of the above-described methods of FIGS. 10 and 11 are as follows. Further examples are described with reference to embodiments 1 to 16.

In some embodiments, the portion of the bit sequence before the polar transform is a portion of the input bit sequence c. In some embodiments, the above methods further comprising a rate profile operation, wherein the input of the rate profile operation is based on the input bit sequence c, wherein, the portion of the bit sequence before the polar transform is a portion of an output of the rate profile operation.

In some embodiments, the repetition operation comprising: obtaining, by the first node, a portion of the input bit sequence c; and determining, by the first node, a second bit sequence c' according to a repetition index sequence $R=[R_0, R_1, \ldots, R_{Nr-2}, R_{Nr-1}]$ as $c'_r=c_{R_r}$, $r=0, 1, 2, \ldots, Nr$, wherein, Nr is a pre-defined integer. In some embodiments, for $r=0, 1, 2, \ldots, Nr-1$, $R_r$ is smaller than K. In some embodiments, for $r=0, 1, 2, \ldots, Nr-1$, $R_r$ is smaller than N, wherein N is the polar matrix size of the polar transform. In some embodiments, $R_r$ satisfies one of the following: $R_r$ is an integer smaller than K, $R_r$ is smaller than N with N being the polar matrix size of the polar transform.

In some embodiments, the repetition operation comprising: obtaining, by the first node, a portion of the input bit sequence c; and determining, by the first node, a second bit sequence c' according to a repetition index $R=[R_0, R_1, \ldots, R_{Nr-2}, R_{Nr-1}]$ and a repetition number sequence $T=[T_0, T_1, \ldots, T_{Nr-2}, T_{Nr-1}]$ such that for $r=0, 1, 2, \ldots, Nr-1$, c' comprises $T_r$ copies of an $R_r$-th bit in the portion of the input bit sequence c. In some embodiments, $R_r$ is an integer smaller than K. In some embodiments, for $r=0, 1, 2, \ldots, Nr-1$, $R_r$ is smaller than N, wherein N is the polar matrix size of the polar transform. In some embodiments, $R_r$ satisfies one of the following: $R_r$ is an integer smaller than K, $R_r$ is smaller than N with N being the polar matrix size of the polar transform.

In some embodiments, the repetition operation comprising: obtaining, by the first node, a portion of a rate profiling output bit sequence $v=[v_0, v_1, v_2, \ldots, v_{N-1}]$ and a portion of a data index set $Q=\{Q_0, Q_1, \ldots, Q_{K-1}\}$ of length Nq, wherein Nq is a positive integer, the portion of the rate profiling output bit sequence $v=[v_0, v_1, v_2, \ldots, v_{N-1}]$ is the output of a rate profile operation; determining, by the first node, an index $Q_{mod(r,Nq)}$ for $r=0, 1, 2, \ldots, E-N-1$; and determining, by the first node, a bit $v_{Q_{mod(r,Nq)}}$ with the index $Q_{mod(r,Nq)}$ in the portion of the rate profiling output bit sequence v into a bit in the repetition output bit sequence c' as for $r=0, 1, 2, \ldots, E-N-1$, $c'_r=v_{Q_{mod(r,Nq)}}$. In some embodiments, Nq is less than or equal to K. In some embodiments, for $r=0, 1, 2, \ldots, Nr-1$, $R_r$ is smaller than N, wherein N is the polar matrix size of the polar transform.

In some embodiments, the output bit sequence is determined by further performing a rate profile operation based on the input bit sequence. In some embodiments, the input of the repetition operation is based on an output of the rate profile operation. In some embodiments, the rate profile operation is performed on an input bit sequence $c=[c_0, c_1, \ldots, c_{K-1}]$ using a data bit index set $Q=\{Q_0, Q_1, \ldots, Q_{K-1}\}$ to obtain a rate profile output bit sequence $v=[v_0, v_1, \ldots, v_{N-1}]$.

In some embodiments, the above methods further comprising performing a pre-transform operation, wherein the input of the pre-transform operation is based on the input sequence. In some embodiments, the input of the pre-transform operation is based on an output of a rate profile operation. In some embodiments, a bit in an output of the pre-transform operation is determined by a convolution bit sequence or a convolution polynomial. In some embodiments, the convolution bit sequence comprises a generator bit sequence $g=[g_0, g_1, \ldots, g_m]$, or a recursive feedback bit sequence $q=[q_0, q_1, \ldots, q_m]$. In some embodiments, the convolution polynomial comprises a generator polynomial $g(D)=g_0+g_1\cdot D+ \ldots +g_{m-1}\cdot D^{m-1}+g_m\cdot D^m$, or a recursive feedback polynomial $q(D)=q_0+q_1\cdot D+ \ldots +q_{m-1}\cdot D^{m-1}+q_m\cdot D^m$.

In some embodiments, the polar transform is performed based on a polar matrix. In some embodiments, the output bit sequence is determined further by performing an interleaving operation, wherein the input of the interleaving operation is based on the input bit sequence. In some embodiments, the interleaving operation is determined by an interleaving pattern $J=[J_0, J_1, J_2, \ldots, J_{N-2}, J_{N-1}]$ of length N, wherein N is an integer larger than 1. In some embodiments, the input of the interleaving operation is based on an output of the polar transform.

In some embodiments, the above methods further comprising performing a concatenation operation, wherein the input of the concatenation operation is based on the input sequence. In some embodiments, the input of the concatenation operation is based on an output of the repetition operation. In some embodiments, the input of the concatenation operation is based on an output of the polar transform. In some embodiments, the input of the concatenation operation is based on an output of an interleaving operation.

It will be appreciated that the present document discloses methods and apparatus related to rate matching schemes applying to polar coding, PAC coding, or other pre-transformed polar coding. In 5G mobile communications standard of 3GPP, low-density parity-check (LDPC) codes are used for data transmission. However, LDPC has certain drawbacks compared to polar codes in short payload size (also called transport block size (TBS)). Alternatively, PAC codes can achieve finite-length bounds in moderate decoding complexity. PAC codes have code lengths with power of 2 ($N=2^n$ with positive integer n) as polar codes. However, to efficiently transmitting a payload (or transport block (TB)) in different wireless channel environments, it does not always have a code length of $N=2^n$ in time and frequency resources allocated by a base station (BS). Therefore, rate matching schemes are needed for applying PAC codes in wireless communications.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for digital communication, comprising:

determining, by a first node, an output bit sequence having E bits based on an input bit sequence c having K bits, wherein the output bit sequence is determined as a concatenation of (a) a bit sequence based on an output of a polar transform and (b) an output of a repetition operation, wherein the output of the polar transform is determined as the polar transform of a rate profiling output bit sequence, wherein the output of the repetition operation is determined based on a repetition index sequence $R=[R_0, R_1, \ldots, R_{Nr-2}, R_{Nr-1}]$ or a portion of a data index set $Q=\{Q_0, Q_1, \ldots, Q_{K-1}\}$, wherein Nr is a pre-defined integer and K is a positive integer, wherein an input of the repetition operation is a portion of the input bit sequence or a portion of the rate profiling output bit sequence, and wherein the rate profiling output bit sequence is determined by combining one or more zero bits with the input bit sequence; and transmitting, by the first node, a signal including the output bit sequence to a second node.

2. The method of claim 1, wherein the output of the repetition operation is determined based on the repetition index sequence as $c'_r = c_{R_r}$, r=0, 1, 2, . . . , Nr−1, wherein for r=0, 1, 2, . . . , $N_{r-1}$, $R_r$ satisfies one of $R_r$ being smaller than K or $R_r$ being smaller than N with N being a polar matrix size of the polar transform.

3. The method of claim 1, wherein the output of the repetition operation is determined based on the repetition index sequence and a repetition number sequence $T=[T_0, T_1, \ldots, T_{Nr-2}, T_{Nr-1}]$ such that for r=0, 1, 2, . . . , $N_{r-1}$, c' comprises $T_r$ copies of an $R_r$-th bit in the portion of the input bit sequence c.

4. The method of claim 3, where $R_r$ is an integer smaller than K.

5. The method of claim 1, wherein the first node is configured to perform the repetition operation by:

determining an index $Q_{mod(r,Nq)}$ for r=0, 1, 2, . . . , E−N−1; and determining a bit $c_r'$ in the output of the repetition operation c' as $c_r' = v_{Q_{mod(r,Nq)}}$ for r=0, 1, 2, . . . , E−N−1, wherein $v_{Q_{mod(r,Nq)}}$ is a bit in the portion of the rate profiling output bit sequence with the index $Q_{mod(r,Nq)}$.

6. The method of claim 5, wherein Nq is less than or equal to K.

7. A method for digital communication, comprising:

receiving, by a second node, a signal including an output bit sequence having E bits from a first node; and determining, by the second node, an input bit sequence c having K bits based on the signal, wherein the output bit sequence is determined based on as a concatenation of (a) a bit sequence based on an output of a polar transform and (b) an output of a repetition operation, wherein the output of the polar transform is determined as the polar transform of a rate profiling output bit sequence, wherein the output of the repetition operation is determined based on a repetition index sequence $R=[R_0, R_1, \ldots, R_{Nr-2}, R_{Nr-1}]$ or a portion of a data index set $Q=\{Q_0, Q_1, \ldots, Q_{K-1}\}$, wherein Nr is a pre-defined integer and K is a positive integer, wherein an input of the repetition operation is a portion of the input bit sequence or a portion of the rate profiling output bit sequence, and wherein the rate profiling output bit sequence is determined by combining one or more zero bits with the input bit sequence.

8. The method of claim 7, wherein the output bit sequence is further determined based on a pre-transform operation, wherein an input of the pre-transform operation is the rate profiling output bit sequence.

9. The method of claim 8, wherein a bit in the output of the pre-transform operation is determined by a convolution bit sequence or a convolution polynomial, and wherein the convolution bit sequence comprises a generator bit sequence $g=[g_0, g_1, \ldots, g_m]$, or a recursive feedback bit sequence $q=[q_0, q_1, \ldots, q_m]$.

10. The method of claim 9, wherein the convolution polynomial comprises a generator polynomial $g(D)=g_0+g_1 \cdot D+ \ldots +g_{m-1} \cdot D^{m-1}+g_m \cdot D^m$, or a recursive feedback polynomial $q(D)=q_0+q_1 \cdot D+ \ldots +q_{m-1}, D^{m-1}+q_m \cdot D^m$.

11. An apparatus for communication network, comprising:

a processor configured to:

determine an output bit sequence having E bits based on an input bit sequence c having K bits, wherein the output bit sequence is determined as a concatenation of (a) a bit sequence based on an output of a polar transform and (b) an output of a repetition operation, wherein the output of the polar transform is determined as the polar transform of a rate profiling output bit sequence, wherein the output of the repetition operation is determined based on a repetition index sequence $R=[R_0, R_1, \ldots, R_{Nr-2}, R_{Nr-1}]$ or a portion of a data index set $Q=\{Q_0, Q_1, \ldots, Q_{K-1}\}$, wherein Nr is a pre-defined integer and K is a positive integer, wherein an input of the repetition operation is a portion of the input bit sequence or a portion of the rate profiling output bit sequence, and wherein the rate profiling output bit sequence is determined by combining one or more zero bits with the input bit sequence; and transmit a signal including the output bit sequence to a second node.

12. The apparatus of claim 11, wherein the polar transform is performed based on a polar matrix, and wherein the output bit sequence is further determined based on an interleaving operation, and wherein an input of the interleaving operation is the output of the polar transform.

13. The apparatus of claim 12, wherein the interleaving operation is determined by an interleaving pattern $J=[J_0, J_1, J_2, \ldots, J_{N-2}, J_{N-1}]$ of length N, wherein Nis an integer larger than 1.

14. The method of claim 1, wherein the output bit sequence is further determined based on a pre-transform operation, wherein an input of the pre-transform operation is the rate profiling output bit sequence, wherein the pre-transform operation is based on a first generator polynomial, a first recursive feedback polynomial, or a second generator polynomial and a second recursive feedback polynomial.

15. The method of claim 8, wherein the pre-transform operation is based on a first generator polynomial, a first recursive feedback polynomial, or a second generator polynomial and a second recursive feedback polynomial.

16. The apparatus of claim 11, wherein the output bit sequence is further determined based on a pre-transform operation, wherein an input of the pre-transform operation is the rate profiling output bit sequence, wherein the pre-transform operation is based on a first generator polynomial, a first recursive feedback polynomial, or a second generator polynomial and a second recursive feedback polynomial.

* * * * *